(12) United States Patent
Kondo et al.

(10) Patent No.: US 7,477,415 B2
(45) Date of Patent: Jan. 13, 2009

(54) IMAGE PROCESSING METHOD AND APPARATUS

(75) Inventors: Masaki Kondo, Toyoako (JP); Yasunari Yoshida, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 718 days.

(21) Appl. No.: 11/192,087

(22) Filed: Jul. 29, 2005

(65) Prior Publication Data
US 2006/0022996 A1    Feb. 2, 2006

(30) Foreign Application Priority Data
Jul. 29, 2004    (JP) .................. 2004-221111

(51) Int. Cl.
G06F 15/00    (2006.01)
G06K 15/00    (2006.01)
G03F 3/08    (2006.01)
H04N 1/40    (2006.01)
G04K 15/00    (2006.01)

(52) U.S. Cl. .............. 358/1.16; 358/3.01; 358/518; 358/1.9; 358/2.1; 358/3.23; 358/3.2; 358/3.21

(58) Field of Classification Search .......... 358/518, 358/3.01, 3, 1.9; 345/590
See application file for complete search history.

(56) References Cited

U.S. PATENT DOCUMENTS

| 5,299,291 | A | | 3/1994 | Ruetz | |
|---|---|---|---|---|---|
| 5,539,540 | A | * | 7/1996 | Spaulding et al. | 358/518 |
| 5,721,572 | A | * | 2/1998 | Wan et al. | 345/590 |
| 7,239,422 | B2 | * | 7/2007 | Braun et al. | 358/1.9 |
| 7,365,879 | B2 | * | 4/2008 | Braun et al. | 358/1.9 |

(Continued)

FOREIGN PATENT DOCUMENTS

JP    4196680    7/1992

(Continued)

OTHER PUBLICATIONS

Japanese Patent Office, Office Action dated Dec. 12, 2006 for Patent Application No. 2004-221111.

*Primary Examiner*—King Y Poon
*Assistant Examiner*—Akwasi M Sarpong
(74) *Attorney, Agent, or Firm*—Banner & Witcoff, Ltd.

(57) ABSTRACT

A first conversion table defines a plurality of grid points that are arranged in a predetermined color space. The grid points include a darkest grid point that is indicative of a darkest point among all the grid points. The grid points further include at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively. The first conversion table lists up an intermediate-component-value combination at each grid point, the intermediate-component-value combination, at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point.

33 Claims, 18 Drawing Sheets

U.S. PATENT DOCUMENTS

| | | | | |
|---|---|---|---|---|
| 2004/0017595 | A1* | 1/2004 | Ikeda | 358/518 |
| 2004/0227977 | A1* | 11/2004 | Yoshida | 358/3.01 |
| 2005/0018222 | A1* | 1/2005 | Yoshida | 358/1.9 |
| 2005/0254073 | A1* | 11/2005 | Braun et al. | 358/1.9 |

FOREIGN PATENT DOCUMENTS

| | | |
|---|---|---|
| JP | 6-225131 | 8/1994 |
| JP | 6-225132 | 8/1994 |
| JP | 6-233129 | 8/1994 |
| JP | 2003-078774 | 3/2003 |
| JP | 2003298862 | 10/2003 |
| JP | 2004-248314 | 9/2004 |
| JP | 2004-343797 | 12/2004 |

* cited by examiner

| GRID NUMBER | ( R, G, B ) | ( R', G', B' ) |
|---|---|---|
| 0 | ( 0, 0, 0) | ( , , ) |
| 1 | ( 32, 0, 0) | ( , , ) |
| 2 | ( 32, 32, 0) | ( , , ) |
| ⋮ | ⋮ | ⋮ |
| $17^3$ | (255, 255, 255) | ( , , ) |

| GRID NUMBER | ( R, G, B ) | ( C, M, Y, K ) |
|---|---|---|
| 0 | ( 0, 0, 0) | ( , , ) |
| 1 | ( 16, 0, 0) | ( , , ) |
| 2 | ( 16, 16, 0) | ( , , ) |
| ⋮ | ⋮ | ⋮ |
| $17^3$ | (255, 255, 255) | ( , , ) |

PC-PRINTING

| 8 | 7 | 6 | 5 | 4 | 3 | 2 | 1 | n |
|---|---|---|---|---|---|---|---|---|
| $R_8$ | $G_8$ | $B_8$ | $C_8$ | $M_8$ | $Y_8$ | | | |
| $R_7$ | $G_7$ | $B_7$ | $C_7$ | $M_7$ | $Y_7$ | | | |
| $R_6$ | $G_6$ | $B_6$ | $C_6$ | $M_6$ | $Y_6$ | | | |
| $R_5$ | $G_5$ | $B_5$ | $C_5$ | $M_5$ | $Y_5$ | | | |
| $R_4$ | $G_4$ | $B_4$ | $C_4$ | $M_4$ | $Y_4$ | | | |
| $R_3$ | $G_3$ | $B_3$ | $C_3$ | $M_3$ | $Y_3$ | | | |
| $R_2$ | $G_2$ | $B_2$ | $C_2$ | $M_2$ | $Y_2$ | | | |
| $R_1$ | $G_1$ | $B_1$ | $C_1$ | $M_1$ | $Y_1$ | | | |
| $R_0$ | $G_0$ | $B_0$ | $C_0$ | $M_0$ | $Y_0$ | | | |

FIG.6(b)

MEDIA-PRINTING

| 8 | 7 | 6 | 5 | 4 | 3 | 2 | 1 | n |
|---|---|---|---|---|---|---|---|---|
| $R_8$ | $G_8$ | $B_8$ | $C_8$ | $M_8$ | $Y_8$ | | | |
| $R_7$ | $G_7$ | $B_7$ | $C_7$ | $M_7$ | $Y_7$ | | | |
| $R_6$ | $G_6$ | $B_6$ | $C_6$ | $M_6$ | $Y_6$ | | | |
| $R_5$ | $G_5$ | $B_5$ | $C_5$ | $M_5$ | $Y_5$ | | | |
| $R_4$ | $G_4$ | $B_4$ | $C_4$ | $M_4$ | $Y_4$ | | | |
| $R_3$ | $G_3$ | $B_3$ | $C_3$ | $M_3$ | $Y_3$ | | | |
| $R_2$ | $G_2$ | $B_2$ | $C_2$ | $M_2$ | $Y_2$ | | | |
| $R_1$ | $G_1$ | $B_1$ | $C_1$ | $M_1$ | $Y_1$ | | | |
| $R_0$ | $G_0$ | $B_0$ | $C_0$ | $M_0$ | $Y_0$ | | | |

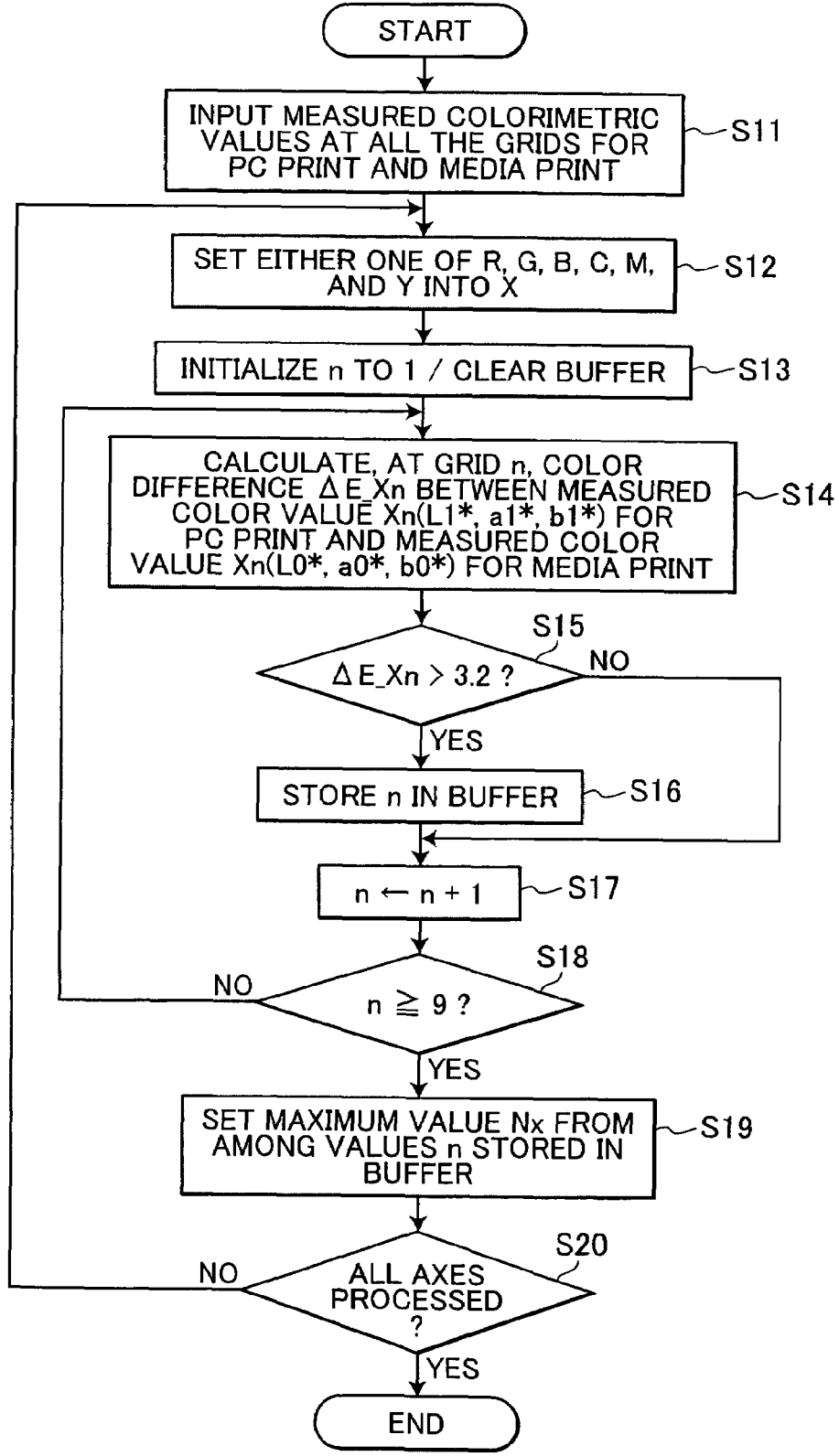

GRID CORRECTING PROCESS

GRID CORRECTING PROCESS

FIG.17

| GRID NUMBER | ( R, G, B ) | ( C, M, Y ) |
|---|---|---|
| 0 | ( 0, 0, 0) | ( , , ) |
| 1 | ( 32, 0, 0) | ( , , ) |
| 2 | ( 32, 32, 0) | ( , , ) |
| ⋮ | ⋮ | ⋮ |
| $17^3$ | (255, 255, 255) | ( , , ) |

4d

IMAGE PROCESSING METHOD AND APPARATUS

BACKGROUND OF THE INVENTION

1. Field of the Invention

The present invention relates to an image processing method and apparatus.

2. Description of Related Art

Digital cameras have recently become popular because their capabilities are improved and they become inexpensive.

Conventionally, an image captured by a digital camera is downloaded to a personal computer (PC), then is outputted from the PC to a color printer (such as an inkjet printer) for printing.

SUMMARY OF THE INVENTION

The above-described type of printing will be referred to as "PC printing" hereinafter.

When an image is captured by a digital camera, data of the image in the JPEG format, or the like, is stored in an external data recording medium. It is conceivable to insert the external data recording medium directly into a color printer, which in turn reads out the image data and prints the images. This type of printing will be referred to as "media printing" hereinafter.

A PC has a large-capacity storage device such as a hard disk that stores therein a processing program and large amounts of conversion data that can convert image data into print data that faithfully reproduces the original image data. On the other hand, a color printer has a small storage capacity. Accordingly, the color printer cannot execute the processing the same as the PC does. For that reason, color differences will occur between an image obtained by PC printing based on some image data and an image obtained by media printing based on the same image data.

More specifically, according to the PC printing, the PC can convert the original RGB image data into four-color-component values for cyan (C), magenta (M), yellow (Y), and black (K), by using a look-up table. In contrast thereto, according to the media printing, the printer may first convert the image data inputted from the external data recording medium into three-color-component values for cyan, magenta, and yellow, then perform processing to determine values for the black component based on the component values for those three colors. This course of processing will possibly cause "tone-jumping" and hue shifts in dark areas.

Japanese Patent Application Publication No. 2003-78774 discloses a color adjustment method that reduces color differences between output images that are obtained by two different profiles. However, the method cannot prevent occurrence of hue shifts and "tone-jumping" in dark areas.

In view of the above-described drawbacks, it is an objective of the present invention to provide improved image processing method and apparatus that can prevent occurrence of "tone-jumping" or hue shifts in dark areas.

In order to attain the above and other objects, the present invention provides an image processing method, including: receiving an input value combination that includes a plurality of input values for a plurality of primary colors and that is indicative of image information; converting the input value combination into a first output value combination that includes a plurality of output values for a plurality of printing-components including black; and printing the first output value combination.

The converting the input value combination into the first output value combination includes: converting, by using a first conversion table, the received input value combination into an intermediate value combination that includes a plurality of intermediate values for a plurality of intermediate components; setting the output value for black based on the intermediate value combination; and setting the output values for the other printing-components based on the output value for black.

The first conversion table defines a plurality of grid points that are arranged in a predetermined color space, in which the input value combination is located, the plurality of grid points being in one-to-one correspondence with a plurality of different primary-color-value combinations for the plurality of primary colors. The grid points include a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively. The first conversion table lists up an intermediate-component-value combination at each grid point, the intermediate-component-value combination, at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point.

According to another aspect, the present invention provides an image processing method, including: preparing a first conversion table; printing several first sample images; printing several second sample images; and measuring calorimetric values of the several first sample images and the several second sample images.

The first conversion table defines a plurality of grid points that are arranged in a predetermined color space, the plurality of grid points being in one-to-one correspondence with a plurality of different primary-color-value combinations, each primary-color-value combination including a plurality of values for the plurality of primary colors, the grid points including a darkest grid point that is indicative of a darkest point among all the grid points, the grid points further including several grid points that are successively arranged in a predetermined direction from the darkest grid point, the first conversion table listing up an intermediate-component-value combination at each grid point, the intermediate-component-value combination including a plurality of intermediate values for a plurality of intermediate components.

The several first sample images are printed, by converting several primary-color-value combinations, which correspond to the several grid points, into several first output value combinations, each first output value combination including a plurality of output values for the plurality of printing-components including black. The printing each of the several first sample images includes: converting, by using the first conversion table, the corresponding primary-color-value combination into an intermediate value combination that includes a plurality of intermediate values for a plurality of intermediate components; setting an output value for black based on the intermediate value combination; and setting output values for the other printing-components based on the output value for black.

The several second sample images are printed based on several second output value combinations, each second output value combination including a plurality of output values for the plurality of printing-components including black, the several second output value combinations being determined by converting the several different primary-color-value combinations at the several grid points by using a second conversion table, the second conversion table listing up a plurality of printing-component-value combinations in one-to-one correspondence with at least the plurality of grid points, each printing-component-value combination including a plurality of values for a plurality of printing-components including black.

The image processing method further includes: judging whether or not a color difference between colorimetric values of one first sample image and one second sample image that are printed based on each grid point is greater than a predetermined threshold value; determining, as an unsuitable grid point, a grid point that occurs a color difference greater than the predetermined threshold value; determining, as a suitable grid point, a grid point that occurs a color difference smaller than or equal to the predetermined threshold value; and correcting the intermediate-component-value combination at the unsuitable grid point through interpolation based on the intermediate-component-value combination at the suitable grid point.

According to another aspect, the present invention provides an image processing apparatus, including: a receiving unit; a storage unit; a first converting unit; and a printing unit.

The receiving unit receives an input value combination that includes a plurality of input values for a plurality of primary colors and that is indicative of image information.

The storage unit stores therein a first conversion table, the first conversion table defining a plurality of grid points that are arranged in a predetermined color space, in which the input value combination is located, the plurality of grid points being in one-to-one correspondence with a plurality of different primary-color-value combinations for the plurality of primary colors, the grid points including a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively, the first conversion table listing up an intermediate-component-value combination at each grid point, the intermediate-component-value combination, at at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point.

The first converting unit converts the input value combination into a first output value combination, the first output value combination including a plurality of output values for a plurality of printing-components including black. The first converting unit includes: an input-to-intermediate converting unit that converts, by using the first conversion table, the received input value combination into an intermediate value combination that includes a plurality of intermediate values for a plurality of intermediate components; a black setting unit that sets the output value for black based on the intermediate value combination; and an other-than-black setting unit that sets the output values for the other printing-components based on the output value for black.

The printing unit prints out the first output value combination.

According to another aspect, the present invention provides an image processing apparatus, including: a first storage unit; a first sample printing unit; a second sample printing unit; a receiving unit; a judging unit; an unsuitable-grid determining unit; a suitable-grid determining unit; and a correcting unit.

The first storage unit stores a first conversion table, the first conversion table defining a plurality of grid points that are arranged in a predetermined color space, the plurality of grid points being in one-to-one correspondence with a plurality of different primary-color-value combinations, each primary-color-value combination including a plurality of values for the plurality of primary colors, the grid points including a darkest grid point that is indicative of a darkest point among all the grid points, the grid points further including several grid points that are successively arranged in a predetermined direction from the darkest grid point, the first conversion table listing up an intermediate-component-value combination at each grid point, the intermediate-component-value combination including a plurality of intermediate values for a plurality of intermediate components.

The first sample printing unit prints several first sample images, by converting several primary-color-value combinations, which correspond to the several grid points, into several first output value combinations, each first output value combination including a plurality of output values for the plurality of printing-components including black. The first sample printing unit includes: a first sample converting unit that converts, by using the first conversion table, the corresponding primary-color-value combination into an intermediate value combination that includes a plurality of intermediate values for a plurality of intermediate components; a black setting unit that sets an output value for black based on the intermediate value combination; and an other-than-black setting unit that sets output values for the other printing-components based on the output value for black.

The second sample printing unit prints several second sample images based on several second output value combinations, each second output value combination including a plurality of output values for the plurality of printing-components including black, the several second output value combinations being determined by converting the several different primary-color-value combinations at the several grid points by using a second conversion table, the second conversion table listing up a plurality of printing-component-value combinations in one-to-one correspondence with at least the plurality of grid points, each printing-component-value combination including a plurality of values for a plurality of printing-components including black.

The receiving unit receives measured calorimetric values of the several first sample images and the several second sample images. The judging unit judges whether or not a color difference between calorimetric values of one first sample image and one second sample image that are printed based on each grid point is greater than a predetermined threshold value. The unsuitable-grid determining unit determines, as an unsuitable grid point, a grid point that occurs a color difference greater than the predetermined threshold value. The suitable-grid determining unit determines, as a suitable grid point, a grid point that occurs a color difference smaller than or equal to the predetermined threshold value. The correcting unit corrects the intermediate-component-value combination at the unsuitable grid point through interpolation based on the intermediate-component-value combination at the suitable grid point.

According to another aspect, the present invention provides a data storage medium storing an image processing program readable by a computer, the image processing program including: a program for receiving an input value combination that includes a plurality of input values for a plurality of primary colors and that is indicative of image information; a program for converting the input value combination into a first output value combination, the first output value combination including a plurality of output values for a plurality of printing-components including black; and a program for printing the first output value combination. The program for converting the input value combination into the first output value combination includes: a program for converting, by using a first conversion table, the received input value combination into an intermediate value combination that includes a plurality of intermediate values for a plurality of intermediate components; a program for setting the output value for black based on the intermediate value combination; and a program for setting the output values for the other printing-components based on the output value for black. The first conversion table defines a plurality of grid points that are arranged in a predetermined color space, in which the input value combination is located, the plurality of grid points being in one-to-one correspondence with a plurality of different primary-color-value combinations for the plurality of primary colors. The grid points include a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively. The first conversion table lists up an intermediate-component-value combination at each grid point, the intermediate-component-value combination, at at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point.

BRIEF DESCRIPTION OF THE DRAWINGS

The above and other objects, features and advantages of the invention will become more apparent from reading the following description of the preferred embodiments taken in connection with the accompanying drawings in which:

FIG. 1(d) shows a look-up table for PC printing;

FIG. 6(a) is a schematic view of color samples that are printed through PC printing;

FIG. 6(b) is a schematic view of color samples that are printed through media printing;

FIG. 7 is a flowchart illustrating a process of searching grid points that are located on the R-, G-, B-, C-, M, and Y-axes in the look-up table for media printing and that should be corrected;

FIG. 17 shows a modification of the look-up table for media printing.

DETAILED DESCRIPTION OF THE PREFERRED EMBODIMENT

Figure 1A:
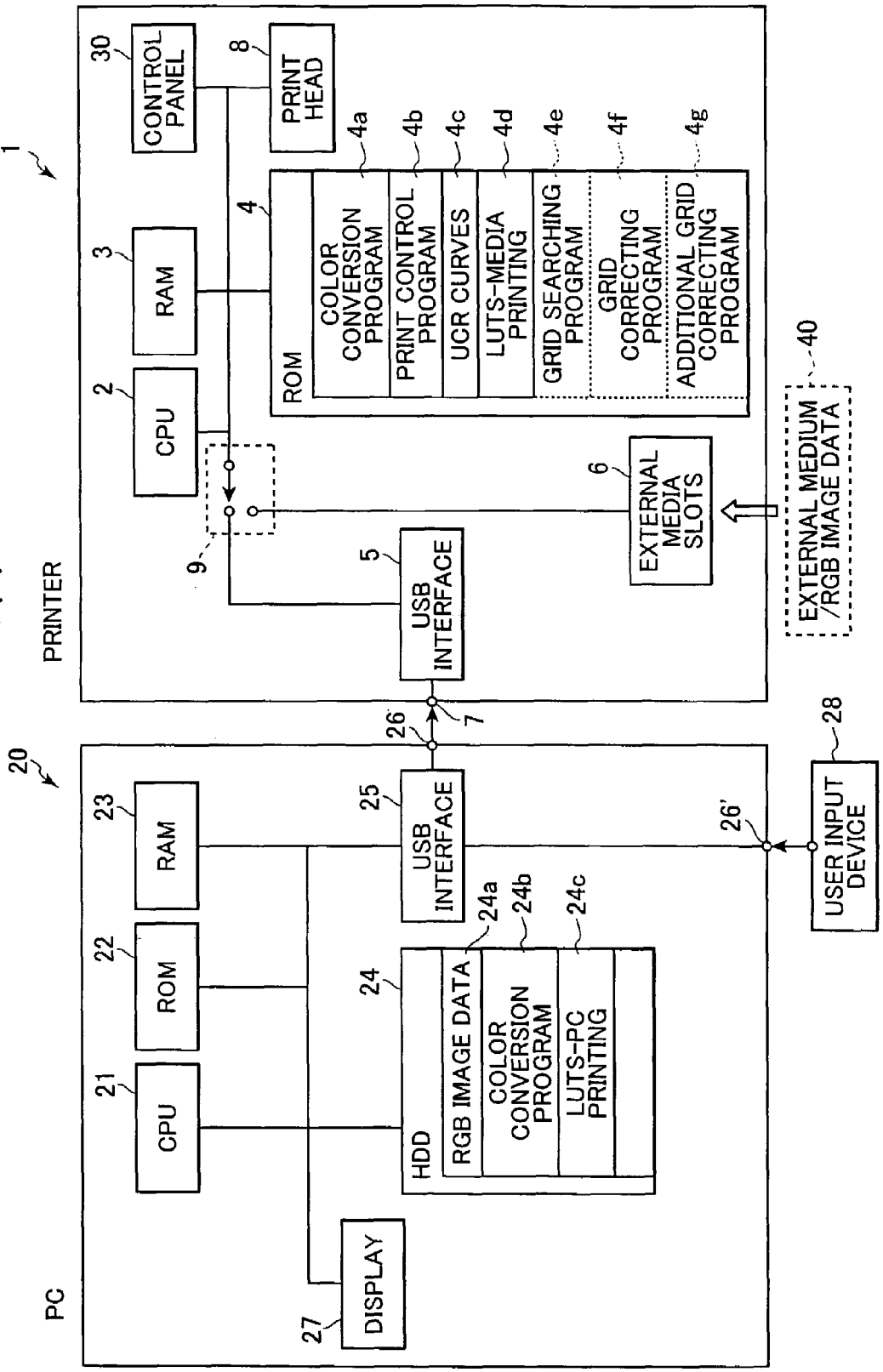
FIG. 1(a) is a block diagram of the electrical configuration of a personal computer (PC) and a printer in accordance with an embodiment of the present invention.

An image processing method and apparatus according to a preferred embodiment of the present invention will be described while referring to the accompanying drawings wherein like parts and components are designated by the same reference numerals to avoid duplicating description.

A block diagram of the electrical configuration of a personal computer (hereinafter abbreviated to "PC") 20 and a printer 1 according to the present embodiment is shown in FIG. 1(a).

The printer 1 is provided with a CPU 2, a RAM 3, a ROM 4, a USB interface 5, a USB connection terminal 7, a switch 9, the external media slots 6, a control panel 30, and a print head 8.

The print head 8 is mounted on a print-head carriage (not shown) that is designed to move over a sheet material. The sheet material is conveyed by a sheet-conveying device (not shown), which is mounted in the printer 1. The print-head carriage and the sheet-conveying device cooperate to enable the print head 8 to eject inks on the sheet material at desired positions.

A USB cable is connected to the USB connection terminal 7. The USB interface 5 is for providing communication with the PC 20 through the USB cable. The USB interface 5 receives CMYK print data from the PC 20 through the USB cable.

The CMYK print data includes a plurality of CMYK ink amount data sets (Cink, Mink, Yink, Kink) for a plurality of pixels in an image desired to be printed. The CMYK ink amount data set (Cink, Mink, Yink, Kink) includes values Cink, Mink, Yink, and Kink for inks of four primary colors of cyan, magenta, yellow, and black, respectively. Each value Cink, Mink, Yink, or Kink is either one of "large dot", "medium dot", "small dot", or "no dot" to indicate the amount of ink of a corresponding color to be ejected.

The external media slots 6 enable insertion and removal of various types of external media 40 that contain RGB image data that has been captured by a digital camera or the like. When some external medium 40 is inserted into one of the external media slots 6, RGB image data stored in the external medium 40 is inputted from the inserted external medium 40 into the printer 1.

The RGB image data includes a plurality of RGB value sets (Rin, Gin, Bin) for a plurality of pixels in an image desired to be printed. Each RGB value set (Rin, Gin, Bin) includes values Rin, Gin, and Bin for three RGB primary colors of red, green, and blue, respectively. Each of the values Rin, Gin, and Bin is expressed as one byte, and therefore ranges from 0 to 255 in decimal notation. Each RGB value set (Rin, Gin, Bin) is therefore defined in a three dimensional RGB color space, wherein R-, G-, and B-axes extend perpendicularly with one another. Each axis extends in a range from zero (0) to 255.

The switch 9 switches between the output of the USB interface 5 and the output of the external media slots 6. The switch 9 may automatically turn to the external media slots 6 when an external medium 40 is inserted into one of the external media slots 6. Or, the user can turn this switch 9 to a desirable one of the USB interface 5 and the external media slots 6.

The control panel 30 enables the user to make various settings as will be described later with reference to FIG. 2(a).

For example, the user manipulates the control panel 30 to select his/her desired printing condition from among a plurality of different printing conditions. Each printing condition is defined by a combination of: a type of CMYK inks to be used in the printing, a type of sheet material to be printed on, and a printing resolution.

The CPU 2 is a microprocessor that executes various programs that are stored in the ROM 4.

The RAM 3 is a memory that has a work area for temporarily storing variables and other data while the CPU 2 is executing the various programs.

The ROM 4 is a read only memory prestored with various programs that are executed by the CPU 2. The ROM 4 is also prestored with constants and tables that are used by the CPU 2 when the CPU 2 executes those programs.

More specifically, the ROM 4 is prestored with: data of control programs, including a color conversion program 4a and a print control program 4b; data of a plurality of UCR (under color removal) curves 4c; and data of a plurality of LUTs (look-up-tables) for media printing 4d.

The color conversion program 4a is a program for converting the RGB value sets (Rin, Gin, Bin) to CMYK ink amount data sets (Cink, Mink, Yink, Kink) so that the resultant ink amount data sets (Cink, Mink, Yink, Kink) will control the printer 1 to reproduce the image represented by the original RGB value sets (Rin, Gin, Bin).

More specifically, the conversion program 4a selects one from among the plurality of look-up tables for media printing 4d, and uses the selected look-up table for media printing 4d to convert each RGB value set (Rin, Gin, Bin) into a corrected RGB value set (Rin', Gin', Bin'). The conversion program 4a then converts the corrected RGB value set (Rin', Gin', Bin') into a CMY value set (Cin, Min, Yin) through calculation. The conversion program 4a then selects one from among the plurality of UCR curves 4c, and uses the selected UCR curve 4c to convert the CMY value set (Cin, Min, Yin) into a CMYK value set (Cout, Mout, Yout, Kout). The conversion program 4a then executes a halftone processing to convert the CMYK value set (Cout, Mout, Yout, Kout) into a CMYK ink amount data set (Cink, Mink, Yink, Kink). The conversion program 4a then starts a printing process.

The print control program 4b is for performing the printing process by controlling the print head 81, the print-head carriage (not shown), and the sheet-conveying device (not shown) in accordance with the CMYK print information (Cink, Mink, Yink, Kink) obtained by the color conversion program 4a.

The plurality of look-up tables (LUTs) 4d are provided in one to one correspondence with the plurality of different printing conditions. Each look-up table for media printing 4d is a conversion table for converting a set of RGB values (Rin, Gin, Bin) to a corrected three-dimensional RGB value set (Rin', Gin', Bin').

Figures 1B, 1C:
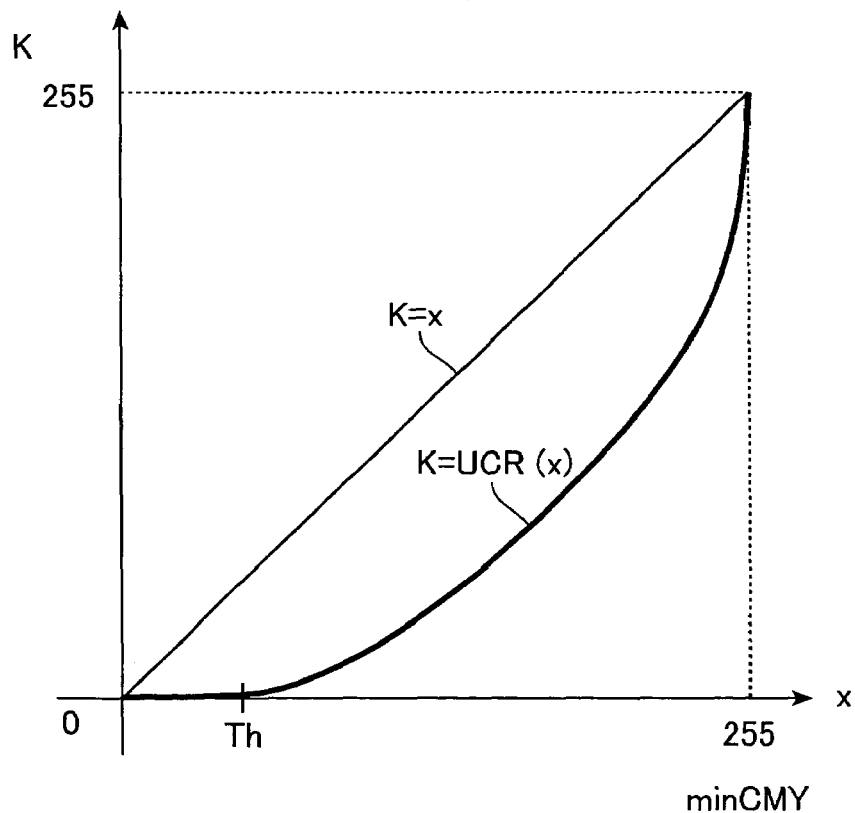
FIG. 1(b) shows a look-up table for media printing.
FIG. 1(c) shows a UCR curve for media printing.

As shown in FIG. 1(b), each look-up table for media printing 4d is defined for a three-dimensional RGB color grid space. The three-dimensional RGB color grid space is defined by dividing the RGB color space almost uniformly into eight sections along each axis. That is, each axis is divided into eight regions in almost equal intervals with nine grid points. The RGB color grid space therefore has $9^3$ grid points (0, 0, 0), (32, 0, 0), (32, 32, 0), . . . , and (255, 255, 255). Each look-up table for media printing 4d stores therein a corrected RGB set value (R', G', B') at each grid point (R, G, B).

The plurality of UCR curves 4c are provided in one to one correspondence with the plurality of different printing conditions.

Each UCR curve 4c is a conversion curve or conversion table for determining the black component value Kout based on the minimum value "minCMY" among one set of CMY values (Cin, Min, Yin).

FIG. 1(c) is a graph showing each UCR curve 4c. In the figure, the horizontal axis x denotes the minimum value "min (CMY)" among the values C, M, and Y in one set of CMY value set (C, M, Y), while the vertical axis denotes the value K.

Each UCR curve 4c is in the form of a curve, in which the value of K is zero (0) in the range in which x=min(CMY) is smaller than a threshold value Th and the value of K gradually increases toward 255 with increasing values of x when x is greater than the threshold Th. Or, the UCR curve 4c may be in the form of a linear expression defined by the equation of K=x=min(CMY).

The PC 20 includes: a CPU 21, a ROM 22, a RAM 23, a hard disk 24 (hereinafter abbreviated to "HDD"), a USB interface 25, USB terminals 26 and 26', and a display 27.

A USB cable is connected to the USB terminal 26. The USB interface 25 is an interface for communicating with an external device through the USB cable. The USB interface 25 is used: to output the CMYK print data (Cink, Mink, Yink, Kink) to the printer 1; to receive RGB image data 24a captured by a digital camera or the like; and to receive RGB image data 24a that has been read in by a scanner function of the printer 1.

Similarly to the RGB image data stored in the external media 40, the RGB image data 24a includes a plurality of RGB value sets (Rin, Gin, Bin) for a plurality of pixels in an image desired to be printed.

A user input device 28, such as a keyboard and a mouse, is connected to the USB terminal 26' via another USB cable. The user can manipulate the user input device 28 to set his/her desired printing condition to the PC 20 while observing the display 27.

The CPU 21 is a microprocessor that executes various programs that are stored in the ROM 22 or the HDD 24. The RAM 23 is memory having a work area that temporarily stores variables and other data while the CPU 21 is executing the various programs.

The HDD 24 is a non-volatile memory device with a large storage capacity. An operating system (OS) and various application programs are stored in the HDD 24. The HDD 24 stores therein the RGB image data 24a, a color conversion program 24b, and a plurality of look-up tables LUT for PC printing 24c.

The color conversion program 24b is a program for converting the RGB value sets (Rin, Gin, Bin) in the RGB image data 24a to CMYK ink amount data sets (Cink, Mink, Yink, Kink) so that the resultant ink amount data sets (Cink, Mink, Yink, Kink) will control the printer 1 to reproduce the image represented by the RGB value sets (Rin, Gin, Bin) in the original RGB image data 24a.

More specifically, the conversion program 24b selects one from among the plurality of look-up tables for PC printing 24c, and uses the selected look-up table for PC printing 24c to convert each RGB value set (Rin, Gin, Bin) into a CMYK value set (Cout, Mout, Yout, Kout). The conversion program 24b then executes a halftone processing to convert the CMYK value set (Cout, Mout, Yout, Kout) into a CMYK ink amount data set (Cink, Mink, Yink, Kink). The color conversion program 24b then transmits the resultant CMYK ink amount data set (Cink, Mink, Yink, Kink) to the printer 1, which in turn performs printing operation based on the CMYK ink amount data set (Cink, Mink, Yink, Kink) by executing the print control program 4b.

The plurality of look-up tables for PC printing 24c are provided in one to one correspondence with the plurality of different printing conditions.

Each look-up table for PC printing 24c is for converting the RGB value sets (Rin, Gin, Bin) into CMYK value sets (Cout, Mout, Yout, Kout).

As shown in FIG. 1(d), each look-up table for PC printing 24c is defined for another three-dimensional RGB color grid space. The three-dimensional RGB color grid space for the look-up table for PC printing 24c is defined by dividing the RGB color space almost uniformly into sixteen sections along each axis. That is, each axis is divided into sixteen regions in almost equal intervals with seventeen grid points. The RGB color grid space therefore has $17^3$ grid points (0, 0, 0), (16, 0, 0), (16, 16, 0), . . . , and (255, 255, 255). The look-up table for media printing 4d stores therein a CMYK set value (C, M, Y, K) at each grid point (R, G, B).

It is noted that the amount of data in a conversion table of a type that converts three-dimensional RGB data into three-dimensional R'G'B' data is much smaller than the amount of data in a conversion table of another type that converts three-dimensional RGB data into four-dimensional CMYK data.

For that reason, the look-up table for media printing 4d is of the type that converts RGB data into R'G'B' data, and is stored in the ROM 4 of the printer 1.

The color conversion program 24b and the look-up tables for PC printing 24c are used to enable the printer 1 to print the RGB image data 24a. Data of the color conversion program 24b and the look-up tables for PC printing 24c is therefore originally stored on a data storage medium, such as a CD-ROM or the like. The data storage medium is attached to the printer 1. The printer 1 thus attached with the data storage medium is shipped from the manufacturer. When the user purchases the printer 1, the user reads out the data of the color conversion program 24b and the look-up tables for PC printing 24c from the data storage medium by using a corresponding data-reading device, such as a CD-ROM drive (not shown) mounted in the PC 20, and stores the data in the HDD 24. It is noted that the PC 20 may have a communications interface (not shown) and may be connected directly to a network such as the Internet. Data of the color conversion program 24b and the look-up tables for PC printing 24c may be downloaded to the HDD 24 directly from the network.

The printer 1 is a multifunction device that can perform a printer function, a facsimile function, a copier function, and a scanner function.

Figure 2A:
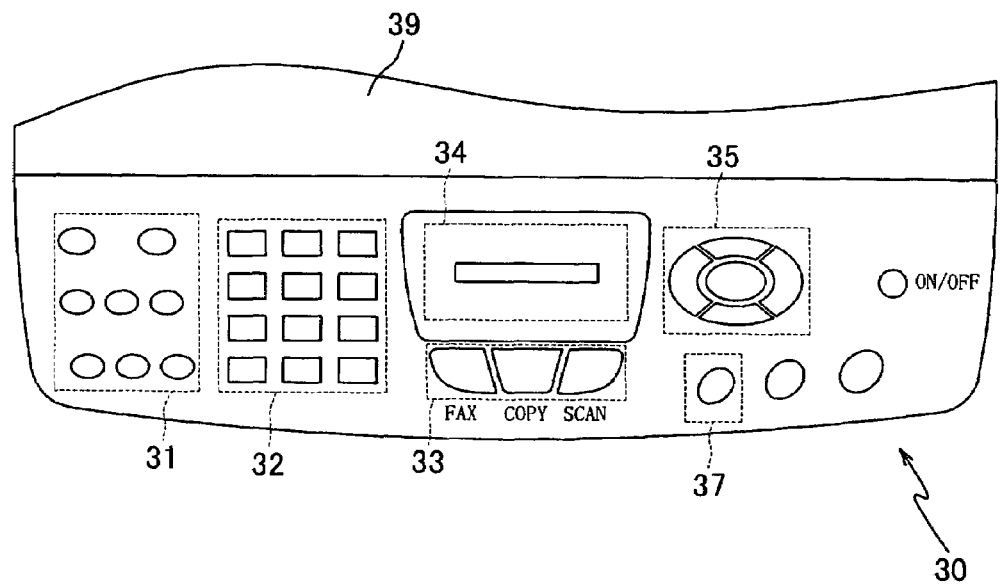
FIG. 2(a) is a partial plan view of an operating panel of the printer of FIG. 1(a)

As shown in FIG. 2(a), the control panel 30 includes: setting switches 31; dialing buttons 32; switches 33; a display portion 34; cursor keys 35; and a start button 37.

The switches 33 are for selecting one of the facsimile function, copier function, and scanner function. It is noted that the printer 1 performs printing operation by executing the print control program 4b when CMYK print data (Cin-k, Mink, Yink, Kink) is received from the PC 20, regardless of which function is selected.

The setting switches 31 are for executing various settings for those functions.

Dialing buttons 32 are used for operations such as inputting the facsimile number of a remote party when sending a facsimile message to the remote party.

A display portion 34 is configured of a liquid-crystal device. The display portion 34 is for displaying setting status and functions. The cursor keys 35 are used for moving the cursor that is displayed on the display portion 34. A user can select a desirable one from among several functions displayed on the display portion 34 by manipulating cursor keys 35 to move a cursor that is also displayed on the display portion 34.

For example, the display portion 34 displays: at least one ink type that can be used in the printer 1; at least one sheet material type that can be used in the printer 1; and a plurality of printing resolutions, at which the printer 1 can perform printing operation. The user selects one ink type, one sheet material type, and one printing resolution by manipulating the cursor keys 35.

A start button 37 is used for specifying the start of the selected function.

A flat bed 39 has a surface, on which an original is disposed when the printer 1 is used as a copier, facsimile machine, or scanner. The printer 1 reads RGB image data (Rin, Gin, Bin) from the original.

Figure 2B:
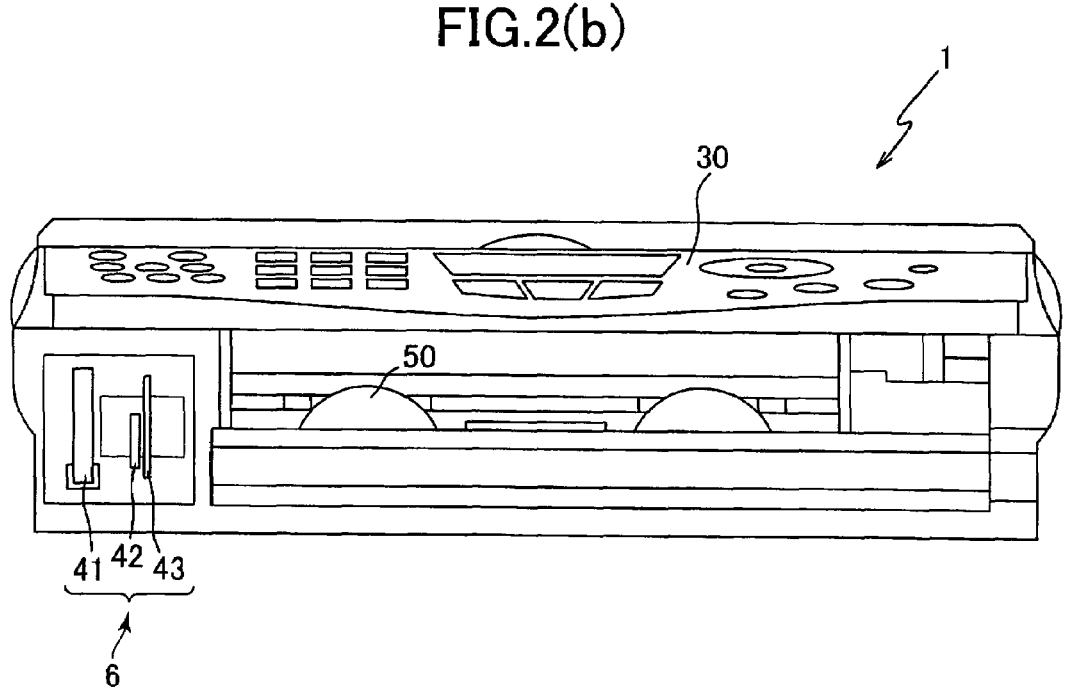
FIG. 2(b) is a front view of the printer.

As shown in FIG. 2(b), a delivery tray 50 and the external media slots 6 are provided on the front of the printer 1. The sheet material is delivered onto the delivery tray 50 after being printed thereon.

Various external media 40 can be inserted into the external media slots 6. In this example, the external media slots 6 include: a slot 41 for compact flash cards (registered trade mark), a slot 42 for memory sticks (registered trade mark), and a slot 43 for smart media cards (registered trade mark).

With the above-described configuration, the system made up from the PC 20 and the printer 1 performs a PC printing. In the PC printing, the PC 20 generates CMYK print data (Cink, Mink, Yink, Kink) based on RGB image data (Rin, Gin, Bin), and transmits the CMYK print data (Cink, Mink, Yink, Kink) to the printer 1. The printer 1 performs printing operation based on the CMYK print data (Cink, Mink, Yink, Kink). The system made up from the PC 20 and the printer 1 also performs a media printing. In the media printing, the printer 1 generates CMYK print data (Cink, Mink, Yink, Kink) based on RGB image data (Rin, Gin, Bin) retrieved from an external medium 40 inserted into one of the external media slots 6. The printer 1 then performs printing operation based on the CMYK print data (Cink, Mink, Yink, Kink).

<PC Printing>

First, the PC printing will be described with reference to FIG. 3(*a*), FIG. 4(*a*), and FIG. 4(*b*).

The CPU 21 performs the PC printing by executing the color conversion program 24*b*. The PC printing is started when the user manipulates the user input device 28 to instruct the PC 20 to start the PC printing. The user selects his/her desired printing condition by manipulating the user input device 28 or the control panel 30, before instructing start of the PC printing.

When the PC printing is started, first, in S1, the CPU 21 sets the user's selected printing condition for the present printing process. The CPU 21 further reads out an RGB value set (Rin, Gin, Bin) for each pixel from the HDD 24.

Next, in S2, the CPU 21 selects one look-up table for PC printing 24*c* from among the plurality of look-up tables for PC printing 24*c*, in accordance with the user's selected printing condition for the present printing process. Then, the CPU 21 converts each RGB value set (Rin, Gin, Bin) into a CMYK value set (Cout, Mout, Yout, Kout) by referencing the selected look-up table for PC printing 24*c*.

More specifically, if some RGB value set (Rin, Gin, Bin) indicates one grid point in the RGB grid color space for the look-up table for PC printing 24*c*, the CPU 21 selects a CMYK value set (C, M, Y, K) that corresponds to the subject grid point from the look-up table for PC printing 24*c*. The CPU 21 simply sets the selected CMYK value set (C, M, Y, K) as a CMYK value set (Cout, Mout, Yout, Kout) for the subject RGB value set (Rin, Gin, Bin).

On the other hand, if some RGB value set (Rin, Gin, Bin) indicates a point other than the grid points in the RGB grid color space for the look-up table for PC printing 24*c*, the CPU 21 first selects several grid points that surround the subject point therein, and calculates a CMYK value set (Cout, Mout, Yout, Kout) by interpolating CMYK value sets (C, M, Y, K) at those several grid points with using a method such as linear interpolation. A representative example of the linear interpolation is a volume interpolation.

Figure 4A:
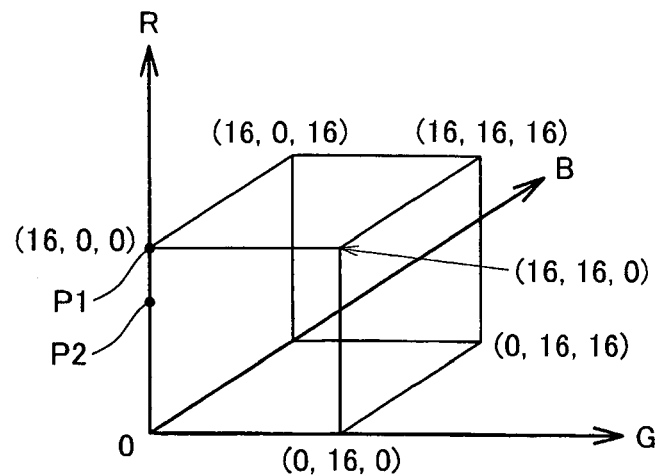
FIG. 4(a) illustrates a part of the RGB color grid space representing the look-up table for PC printing in FIG. 1(d)
Figure 4B:
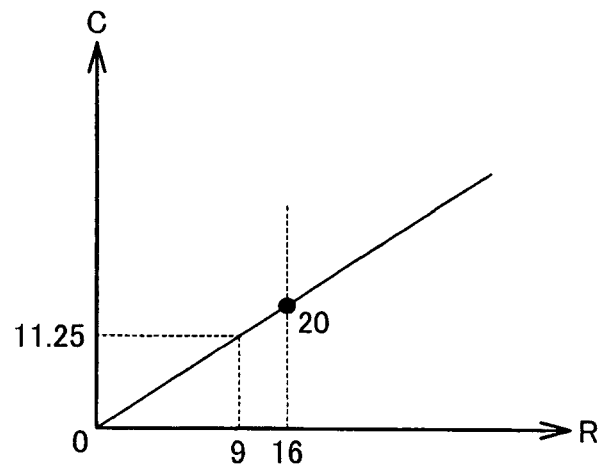
FIG. 4(b) illustrates a method of determining the cyan component Cout in a CMYK value set (Cout, Mout, Yout, Kout) when a point indicated by an RGB value set (Rin, Gin, Bin) is located between neighboring RGB grid points.
Figure 4C:
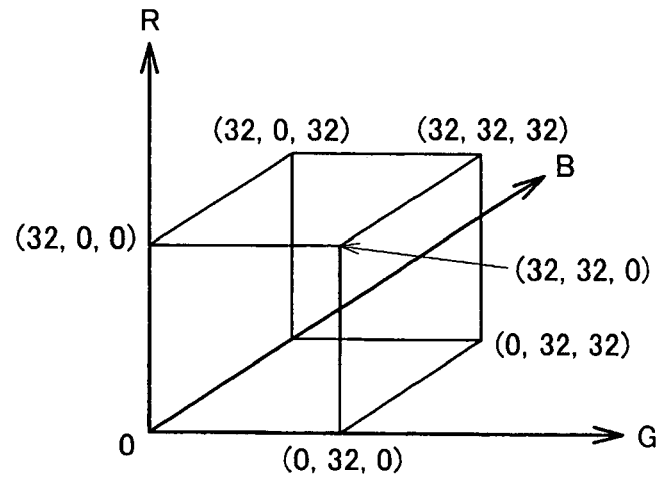
FIG. 4(c) illustrates a part of the RGB color grid space representing the look-up table for media printing in FIG. 1(b)

For example, now assume that the look-up table for PC printing 24*c* indicates that the value C for the grid point (16, 0, 0) is equal to 20 as shown in FIG. 4(*b*).

In this case, if some RGB value set (Rin, Gin, Bin) is equal to (16, 0, 0), the point P1 defined by the RGB value set (Rin, Gin, Bin) is located on the grid point (16, 0, 0), as shown in FIG. 4(*a*). In this case, the value Cout for the RGB value set (16, 0, 0) is determined as equal to 20 as shown in FIG. 4(*b*). On the other hand, if some RGB value set (Rin, Gin, Bin) is equal to (9, 0, 0), the point P2 defined by the RGB value set (Rin, Gin, Bin) is located as being shifted from the grid points, as shown in FIG. 4(*a*). In this case, as shown in FIG. 4(*b*), the value Cout for the RGB value set (9, 0, 0) is calculated by the following formula:

$$Cout = 20 \times 9/16 = 11.25.$$

Thus, the value Cout for the RGB value set (9, 0, 0) is determined as equal to 11.25.

Next, in S3, the CPU 21 performs a halftone processing to convert the CMYK value set (Cout, Mout, Yout, Kout) into a CMYK ink amount data (Cink, Mink, Yink, Kink). The CPU 21 performs this halftone processing by executing an error-diffusion processing or a dither processing to prevent dots of the same size from being arranged successively and therefore to prevent generation of undesirable false contours.

Next, in S4, the CPU 21 outputs the CMYK ink amount data (Cink, Mink, Yink, Kink) as CMYK print data to the printer 1, which in turn will perform printing operation based on the CMYK ink amount data (Cink, Mink, Yink, Kink) by executing the print control program 4*b*.

<Media Printing>

Next, the media printing will be described with reference to FIG. 3(*b*) and FIG. 4(*c*).

The CPU 2 performs the media printing by executing the color conversion program 4*a*. The media printing is started when the user manipulates the control panel 30 to instruct the printer 1 to start the media printing. The user selects his/her desired printing condition by manipulating the control panel 30, before instructing start of the media printing.

When the media printing is started, first, in S5, the CPU 2 sets the user's selected printing condition for the present printing process. The CPU 2 further reads out an RGB value set (Rin, Gin, Bin) for each pixel from an external medium 40 inserted in one of the external media slots 6.

Next, in S6, the CPU 2 selects one look-up table for media printing 4*d* from among the plurality of look-up tables for media printing 4*d* in accordance with the user's selected printing condition for the present printing process. The CPU 2 then converts each RGB value set (Rin, Gin, Bin) into a corrected R'G'B value set (Rin', Gin', Bin') by referencing the selected look-up table for media printing 4*d*.

More specifically, in the same manner as in S2 in the PC printing, if some RGB value set (Rin, Gin, Bin) indicates one grid point in the RGB grid color space for the look-up table for media printing 4*d*, the CPU 2 selects an RGB value set (R', G', B') that corresponds to the subject grid point from the look-up table for media printing 4*d*. The CPU 2 simply sets the selected RGB value set (R', G', B') as a corrected RGB value set (Rin', Gin', Bin') for the subject RGB value set (Rin, Gin, Bin).

On the other hand, if some RGB value set (Rin, Gin, Bin) indicates a point other than the grid points in the RGB grid color space for the look-up table for media printing 4*d*, the CPU 2 first selects several grid points that surround the subject point therein, and calculates a corrected RGB value set (Rin', Gin', Bin') by interpolating RGB value sets (R', G', B') at those several grid points with using a method such as linear interpolation. A representative example of the linear interpolation is a volume interpolation.

Next, in S7, the CPU 2 calculates the values Cin, Min, and Yin in one set of CMY values (Cin, Min, Yin) by calculating the following formulas:

$$Cin = 255 - Rin',$$

$$Min = 255 - Gin', \text{ and}$$

$$Yin = 255 - Bin'.$$

Thus, the CPU 2 converts each set of RGB corrected values (Rin', Gin', Bin') into a set of CMY values (Cin, Min, Yin).

Next, in S8, the CPU 2 selects one UCR curve 4c from among the plurality of UCR curves 4c, in accordance with the user's selected printing condition. The CPU 2 then performs a UCR process by using the selected UCR curve 4c in a manner described below.

First, the CPU 2 determines, for each pixel, a black component value Kout by referring to the selected UCR curve 4c based on the corresponding CMY value set (Cin, Min, Yin).

More specifically, the CPU 2 first determines the smallest value "minCMY" among the CMY values Cin, Min, and Yin in the CMY value set (Cin, Min, Yin) for the subject pixel. Then, the CPU 2 refers to the selected UCR curve 4c, and selects the value K that corresponds to the value minCMY on the UCR curve 4c. The CPU 2 then sets the selected value K as the value Kout.

Then, the CPU 2 corrects the values Cin, Min, and Yin into corrected values Cout, Mout, and Yout based on the value Kout, by calculating the following equations:

$$Cout=Cin-Kout,$$

$$Mout=Min-Kout, \text{ and}$$

$$Yout=Yin-Kout.$$

Figure 3A:
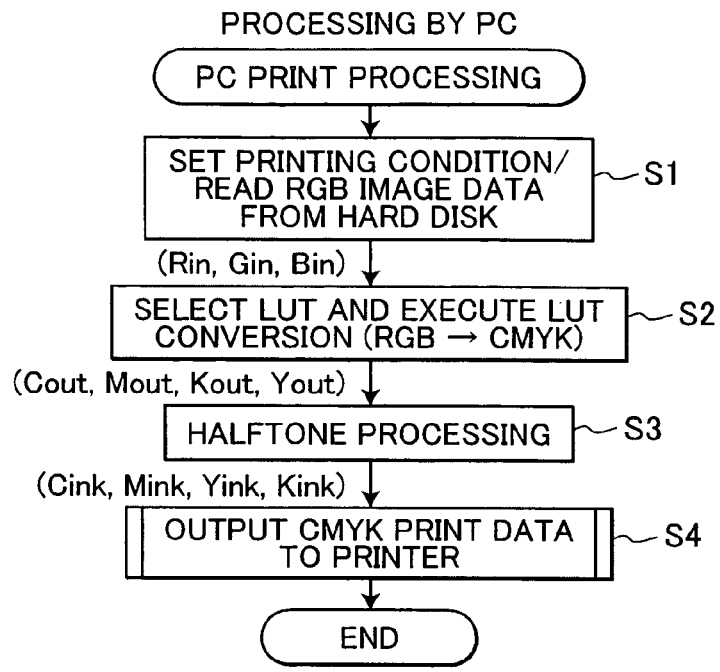
FIG. 3(a) is a flowchart of print processing for PC printing.

Once the CMYK data (Cout, Mout, Yout, Kout) has been obtained, the program proceeds to a halftone process of S9, in which the CMYK data (Cout, Mout, Yout, Kout) is converted into CMYK ink amount data (Cink, Mink, Yink, Kink) in the same manner as in S3 of FIG. 3(a).

Next, the CPU 2 executes a printing process in S10 based on the CMYK ink amount data (Cink, Mink, Yink, Kink) by executing the print control program 4b.

<How to Create Look-Up-Tables for PC Printing 24c, UCR Curves 4c, and Look-Up-Tables for Media Printing 4d>

According to the present embodiment, the look-up-tables for PC printing 24c, the UCR curves 4c, and the look-up-tables for media printing 4d are created for the plurality of printing conditions by the manufacturer in a manner described below.

A plurality of ICC (International Color Consortium) profiles for PC printing are predetermined in one to one correspondence with the plurality of different printing conditions. Each ICC profile for PC printing indicates the relationship between a plurality of sets of RGB data (R, G, B) that are inputtable to the PC printing and a plurality of Lab data (L*, a*, b*) that are desired to be obtained through the PC printing under the corresponding printing condition.

The look-up table for PC printing 24c is determined for each printing condition based on the ICC profile for PC printing for the subject printing condition. That is, the look-up table for PC printing 24c for each printing condition is determined to ensure that color that will be obtained based on each set of the $17^3$ number of RGB data sets (R, G, B) through the PC printing under the subject printing condition will exhibit a color state substantially the same as the corresponding Lab data set (L*, a*, b*).

The UCR curve 4c for each printing condition is determined to have the threshold value Th and the curve characteristics that are optimum for the subject printing condition.

<How to Create Look-Up-Table for Media Printing 4d>

Next will be described how the manufacturer creates the look-up-tables for media printing 4d for the plurality of printing conditions. It is noted that the look-up-tables for media printing 4d for the plurality of printing conditions are created in the same manner as described below.

Figure 5A:
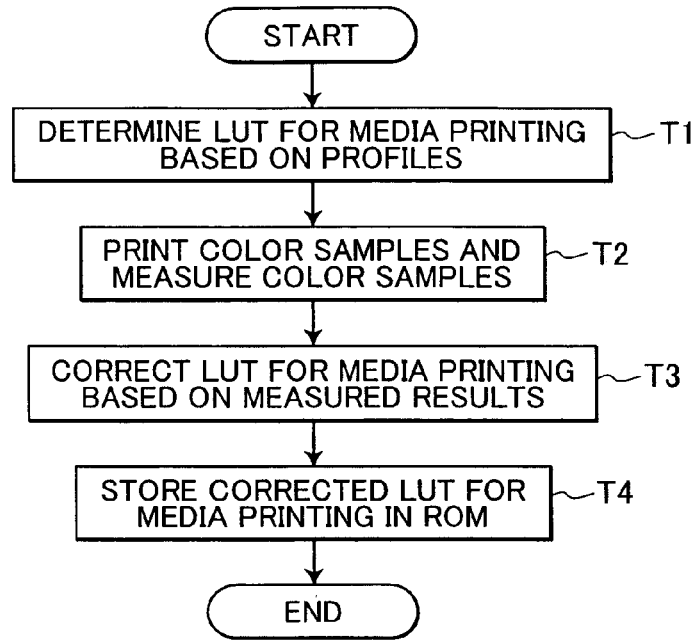
FIG. 5(a) shows an outline of a method of creating the look-up-table for media printing.

The outline of the manner of creating the look-up-table for media printing 4d for one printing condition is shown in FIG. 5(a).

First, in T1, the look-up-table for media printing 4d for the subject printing condition is determined dependently on: the ICC profile for PC printing for the subject printing condition; and an ICC profile for media printing for the subject printing condition.

It is noted that the ICC profile for media printing for one printing condition indicates the relationship between a plurality of sets of RGB data (R', G', B') that are inputtable to S7 of the media printing and a plurality of Lab data (L*, a*, b*) that will be obtained through S7-S10 in the media printing under the subject printing condition.

Next, in T2, the manufacturer controls the printer 1 to print out, based on a plurality of RGB image data sets, a plurality of color samples through media printing under the subject printing condition by using the look-up-table for media printing 4d that has been created in T1. The manufacturer further controls the printer 1 to print out, based on the same RGB image data sets, color samples through PC printing under the same printing condition, by using the look-up table for PC printing 24c for the subject printing condition. The manufacturer controls a calorimeter to measure calorimetric values of the color samples.

Next, in T3, the manufacturer controls his/her computer to correct the look-up-table for media printing 4d for the printing condition based on the measurement results of the calorimetric values of the color samples.

Next, in T4, the manufacturer writes data of the thus corrected look-up table for media printing 4d in the ROM 4, which will be installed in the printer 1.

<Table Determining Process T1>

Next will be described how the manufacturer determines in T1 the look-up-table for media printing 4d for one printing condition.

In T1, first, the ICC profile for media printing is determined for the subject printing condition in a manner described below.

In order to determine the ICC profile for media printing under the subject printing condition, a plurality of RGB value sets (Rin', Gin', Bin') are converted into a plurality of CMYK ink amount data sets (Cink, Mink, Yink, Kink) through S7-S9 of the media printing. Then, the printer 1 is controlled to print a plurality of color samples under the subject printing condition based on the CMYK ink amount data sets (Cink, Mink, Yink, Kink) in S10. Then, a calorimeter is used to measure the Lab value sets (L*, a*, b*) for the colors of the color samples. The ICC profile for media printing under the present printing condition is produced by interconnecting the plurality of RGB value sets (Rin', Gin', Bin') and the measured Lab value sets (L*, a*, b*).

Then, the manufacturer controls his/her computer to determine the look-up-table for media printing 4d under the subject printing condition dependently on: the ICC profile for PC printing for the subject printing condition; and the ICC profile for media printing for the subject printing condition.

It is noted that the look-up-table for media printing 4d for the subject printing condition is for correcting an RGB data set (Rin, Gin, Bin) into a corrected RGB data set (Rin', Gin', Bin') so that color that will be printed in S10 under the subject printing condition, when the corrected RGB data set (Rin', Gin', Bin') is processed through S7-S10 of the media printing by using the UCR curve 4c for the subject printing condition, will appear substantially the same as a color that is printed through the PC printing under the same printing condition based on the original RGB image data set (Rin, Gin, Bin).

The ICC profile for PC printing for one printing condition indicates which Lab value set (L*, a*, b*) will be obtained through PC printing under the subject printing condition when each set of RGB values (R, G, B) is inputted to S2 of the PC printing. Similarly, the ICC profile for media printing for one printing condition indicates which Lab value set (L*, a*, b*) will be obtained through media printing under the subject printing condition when each set of RGB values (R', G', B') is inputted to S7 of the media printing. Accordingly, based on both of the ICC profile for PC printing for one printing condition and the ICC profile for media printing for the same printing condition, it is known how to correct an RGB value set (R, G, B) into a corrected RGB value set (R', G', B') in S6 when desiring to obtain, through the media printing under the subject printing condition, an Lab value set (L*, a*, b*) that is substantially the same as that obtained through PC printing based on the same RGB value set (R, G, B) under the same printing condition. The look-up table for media printing $4d$ is prepared to indicate, for the RGB value set (R, G, B) at each of the $9^3$ grid points, an RGB value set (R', G', B'), to which the subject RGB value set (R, G, B) should be corrected in S6, in order that color obtained through the media printing based on the RGB value set (R, G, B) will become the same as that will be obtained through PC printing when the subject RGB value set (R, G, B) is inputted to the PC printing.

Figure 3B:
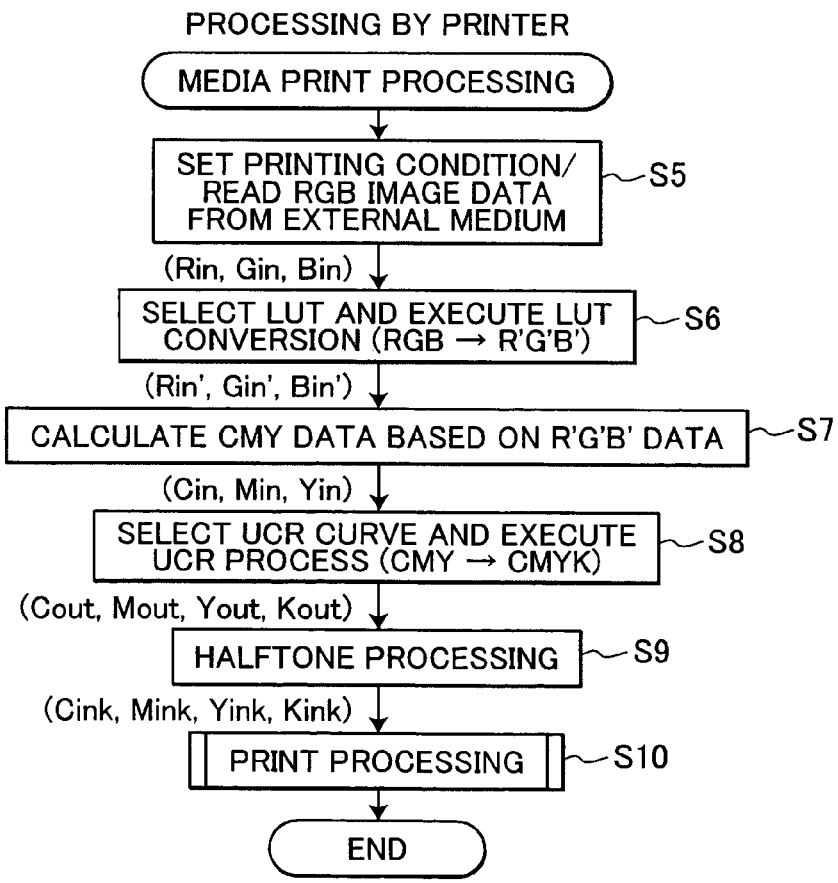
FIG. 3(b) is a flowchart of print processing for media printing.

It is noted that as shown in FIG. 3(b), the color reproducible ranges (gamuts) of the PC printing and the color reproducible ranges (gamuts) of the media printing are defined in the three-dimensional Lab color space, wherein the L*-, a*-, and b*-axes extend perpendicularly with one another. The origin point is defined at the intersection between the L*-, a*-, and b*-axes. The brightness increases as the point moves away from the origin point in the L*-axis direction. In other words, the darkness increases as the point moves toward the origin point in the L*-axis direction. In this figure, the gamut of the media printing is indicated by a solid line, and the gamut of the PC printing is indicated by a broken line.

Figure 5B:
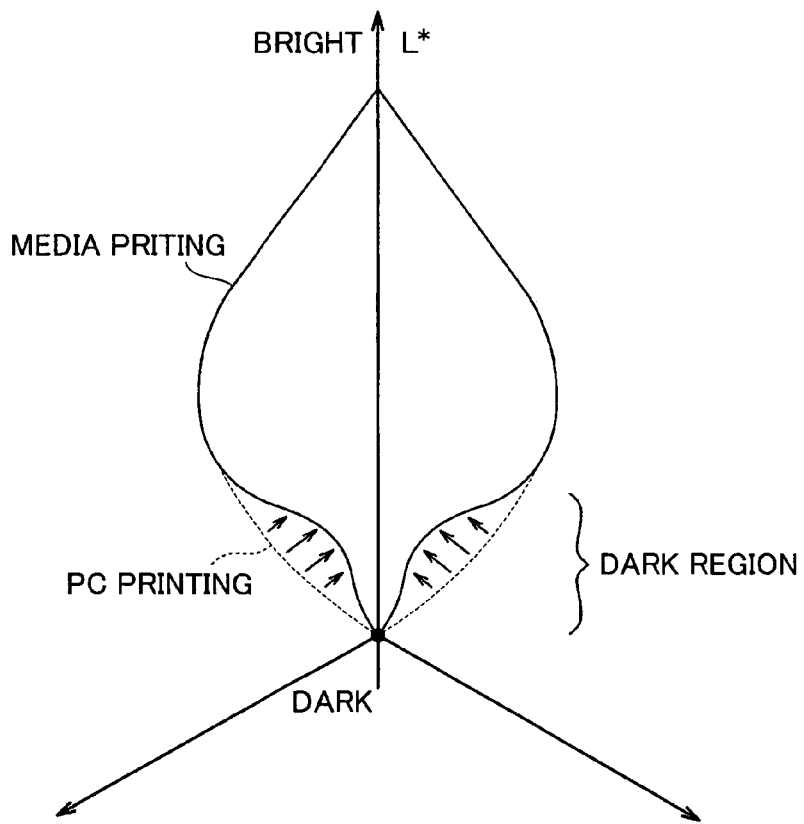
FIG. 5(b) illustrates the relationship between a color reproducible range of PC printing and a color reproducible range of media printing when the media printing is executed by using a look-up table for media printing that is not corrected.

The gamut of the media printing is determined dependently on the ICC profile for media printing, and the gamut of the PC printing is determined dependently on the ICC profile for PC printing. If PC printing is executed by using the look-up table for PC printing $24c$ that is prepared based on the ICC profile for PC printing, colors obtained through the PC printing will fall in the gamut of the PC printing as indicated by the broken line in FIG. 5(b). Similarly, if media printing is executed by using the look-up table for media printing $4d$ that is prepared in T1 as described above, colors obtained through the media printing will fall in the gamut of the media printing as indicated by the solid line in FIG. 5(b).

It is noted that as apparent from the figure, the gamut of the media printing is erroneously shifted from the gamut of the PC printing in the dark region. The range defined between the solid line and the broken line can be obtained by the PC printing, but cannot be obtained by the media printing.

Such an erroneous shift between the gamuts of the media printing and the PC printing occurs for the reasons described below:

During the PC printing, the RGB values are converted directly into four-dimensional CMYK values in S2 by using the look-up table for PC printing $24c$. On the other hand, during media printing, the RGB values are first converted into three-dimensional R'G'B' values in S6, then converted into three-dimensional CMY values in S7, and then converted into four-dimensional CMYK values in S8. These differences in processes induce the differences in the gamuts.

Additionally, in S8 of the media printing, the K component value in the CMYK value is determined by reference to the UCR curve $4c$ based on the minimum value in the CMY values. Accordingly, the UCR process might possibly determine the value K to a value lower than an appropriate value.

According to the present embodiment, in order to reduce the undesirable difference between the gamuts of the PC printing and of the media printing, the sample printing-and-measuring process T2 is executed to actually print out color samples through media printing by using the look-up table for media printing $4d$ that is prepared in T1 and to actually print out color samples through PC printing by using the look-up table for PC printing $24c$. The color samples are then measured. Next, the table correcting process T3 is executed to correct the look-up table for media printing $4d$ based on the measurement results of the color samples.

<Sample Printing-and-Measuring Process T2>

During the sample printing-and-measuring process T2, the manufacturer controls the printer 1 to print out, under the subject printing condition, a plurality of (54, in this examples) color samples through media printing of FIG. 3(b) by inputting a plurality of (54, in this example) RGB values sets (R, G, B) in S5, by using in S6 the look-up table for media printing $4d$ which has been prepared in T1, and by using in S8 the UCR curve $4c$ for the subject printing condition.

As shown in FIG. 6(b), the 54 RGB values sets (R, G, B) include: nine red-indicating RGB value sets $R_0$ (0, 0, 0), $R_1$ (32, 0, 0), $R_2$ (64, 0, 0), . . . , and $R_8$(255, 0, 0) that are arranged successively on the R-axis from the darkest point $R_0$ (0, 0, 0) in a brighter direction; nine green-indicating RGB value sets $G_0$ (0, 0, 0), $G_1$ (0, 32, 0), $G_2$ (0, 64, 0), . . . , and $G_8$(0, 255, 0) that are arranged successively on the G-axis from the darkest point $G_0$ (0, 0, 0) in a brighter direction; nine blue-indicating RGB value sets $B_0$ (0, 0, 0), $B_1$ (0, 0, 32), $B_2$ (0, 0, 64), . . . , and $B_8$(0, 0, 255) that are arranged successively on the B-axis from the darkest point $B_0$ (0, 0, 0) in a brighter direction; nine cyan-indicating RGB value sets $C_0$ (0, 0, 0), $C_1$ (0, 32, 32), $C_2$ (0, 64, 64), . . . , and $C_8$(0, 255, 255) that are arranged successively on a C-axis from the darkest point $C_0$ (0, 0, 0) in a brighter direction; nine magenta-indicating RGB value sets $M_0$ (0, 0, 0), $M_1$ (32, 0, 32), $M_2$ (64, 0, 64), . . . , and $M_8$ (255, 0, 255) that are arranged successively on a M-axis from the darkest point $M_0$ (0, 0, 0) in a brighter direction; and nine yellow-indicating RGB value sets $Y_0$ (0, 0, 0), $Y_1$ (32, 32, 0), $Y_2$ (64, 64, 0), . . . , and $Y_8$ (255, 255, 0) that are arranged successively on a Y-axis from the darkest point $Y_0$(0, 0, 0) in a brighter direction.

Each of the 54 RGB value sets (R, G, B) indicates one of the $9^3$ grid points in the look-up table for media printing $4d$. Each of the 54 RGB value sets (R, G, B) will be referred to as "$X_n$(R, G, B)" hereinafter, wherein X is either one of R, G, B, C, M, or Y, and n is either one of 0 to 8. Each of the 54 grid points indicated by the 54 RGB value sets $X_n$(R, G, B) will be referred to as "$X_n$" hereinafter, wherein X is either one of R, G, B, C, M, or Y, and n is either one of 0 to 8. The RGB value set $X_0$(0, 0, 0) (that is, $R_0$(0, 0, 0), $G_0$(0, 0, 0), $B_0$(0, 0, 0), $C_0$(0, 0, 0), $M_0$(0, 0, 0), and $Y_0$ (0, 0, 0)) indicate the single darkest grid point (origin grid point) (0, 0, 0) in the RGB color space, where the R, G, B, C, M, and Y axes intersect with one another. These RGB value sets $X_0$(0, 0, 0) will therefore be referred to as K(0, 0, 0), and the grid point $X_0$ will be referred to as an origin grid point K, hereinafter.

It is noted that the C-axis extends in a straight line that is angularly shifted from the G- and B-axes by 45 degrees around the R-axis R. The M-axis extends in a straight line that is angularly shifted from the R- and B-axes by 45 degrees around the G-axis. The Y-axis extends in a straight line that is angularly shifted from the R- and G-axes by 45 degrees around the B-axis.

In this way, 54 color samples are printed through the media printing. The 54 color samples include: nine red samples; nine green samples, nine blue samples, nine cyan samples, nine magenta samples, and nine yellow samples.

Similarly, as shown in FIG. 6(a), the manufacturer controls the printer 1 to print out, under the subject printing condition, a plurality of (54, in this examples) color samples through PC printing of FIG. 3(a) by inputting in S1 a plurality of (54, in this example) RGB value sets (R, G, B) the same as those used in the media printing and by using the look-up table for PC printing 24c for the subject printing condition. Each RGB value set (R, G, B) is located at one of the $17^3$ grid points in the look-up table for PC printing 24c. As a result, 54 color samples are printed. The 54 color samples include: nine red samples; nine green samples, nine blue samples, nine cyan samples, nine magenta samples, and nine yellow samples.

Next, the manufacturer controls a calorimeter to measure the calorimetric values of the color samples. A representative example of the calorimeter is "Spectrolino" (trade name) manufactured by GretagMacbeth AG. The measurement results obtained by the calorimeter are defined by L*a*b* value sets (L*, a*, b*).

It is noted that a colorimetric value set (L*, a*, b*) measured for one color sample that is obtained through PC printing based on an RGB value set $X_n$(R, G, B) at one grid point with one grid number n (=0 to 8) on one axis X (=R, G, B, C, M, or Y) will be referred to as $X_n$(L1*, a1*, b1*) hereinafter. Similarly, a calorimetric value set (L*, a*, b*) measured for one color sample that is obtained through media printing based on an RGB value set $X_n$(R, G, B) at one grid point with one grid number n (=0 to 8) on one axis X (=R, G, B, C, M, or Y) will be referred to as $X_n$(L0*, a0*, b0*) hereinafter.

A color difference $\Delta E\_X_n$ is defined for each grid point $X_n$ as a difference between the calorimetric value sets $X_n$(L1*, a1*, b1*) and $X_n$(L0*, a0*, b0*) by the following equation (1):

$$\Delta E\_X_n = \{(L0^* - L1^*)^2 + (a0^* - a1^*)^2 + (b0^* - 11^*)^2\}^{1/2} \quad (1)$$

The color difference $\Delta E\_X_n$ for each grid point $X_n$ indicates a difference in colors between a color sample that is printed through PC printing for the subject grid point $X_n$ and another color sample that is printed through media printing for the same grid point $X_n$.

When the color difference $\Delta E\_X_n$ obtained for one grid point $X_n$ is smaller than or equal to a predetermined value (in this case, 3.2), it is known that the R'G'B' value set (R', G', B') now listed at the subject grid point $X_n$ in the look-up table for media printing 4d is suitable. On the other hand, when the color difference $\Delta E\_X_n$ is greater than the predetermined value, it is known that the R'G'B' value set (R', G', B') now listed at the subject grid point $X_n$ in the look-up table for media printing 4d is unsuitable.

<Table Correcting Process T3>

Figure 8:
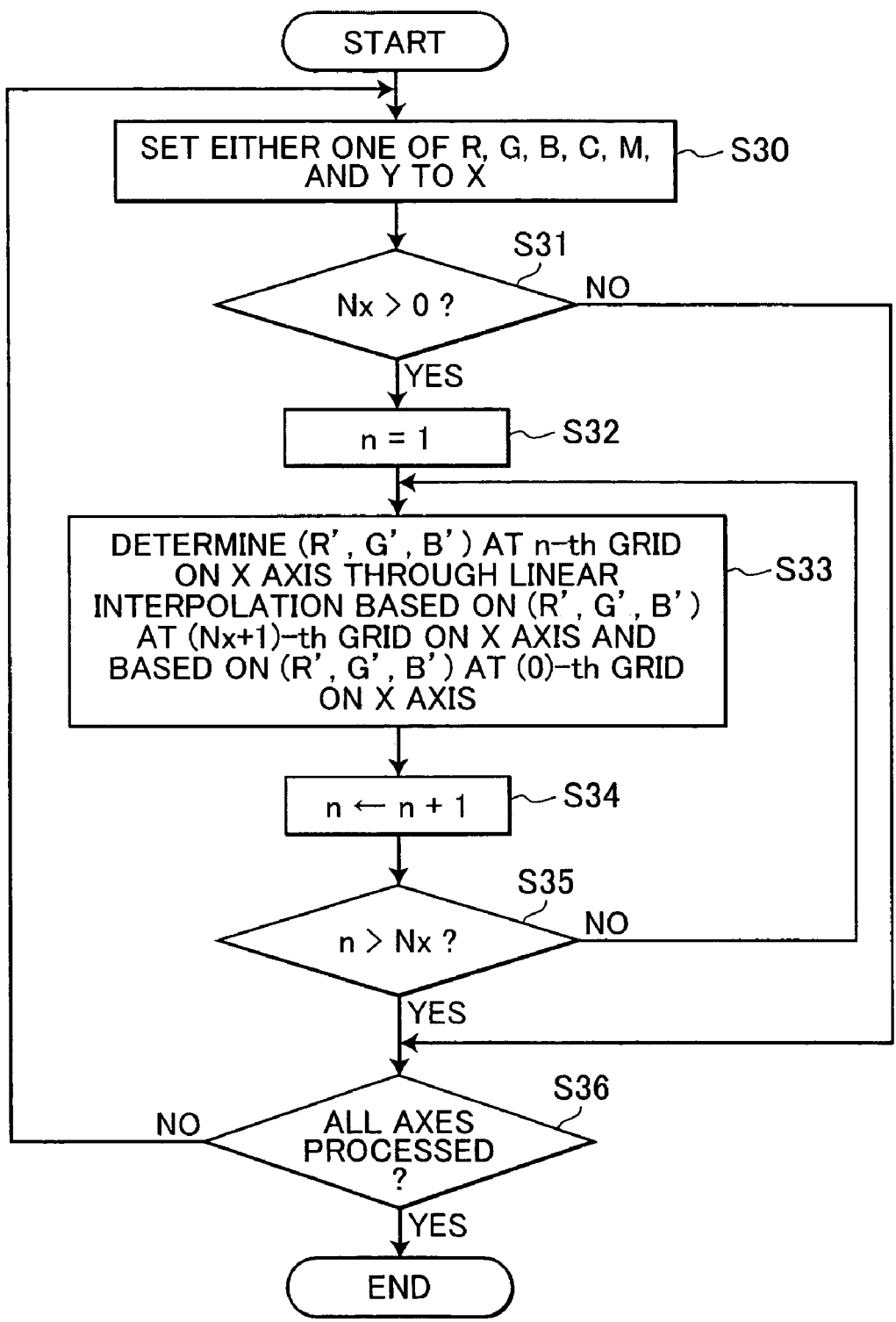
FIG. 8 is a flowchart illustrating a process for correcting, through interpolation, the values at the grid points that are located on the R-, G-, B-, C-, M, and Y-axes and that should be corrected.
Figure 11:
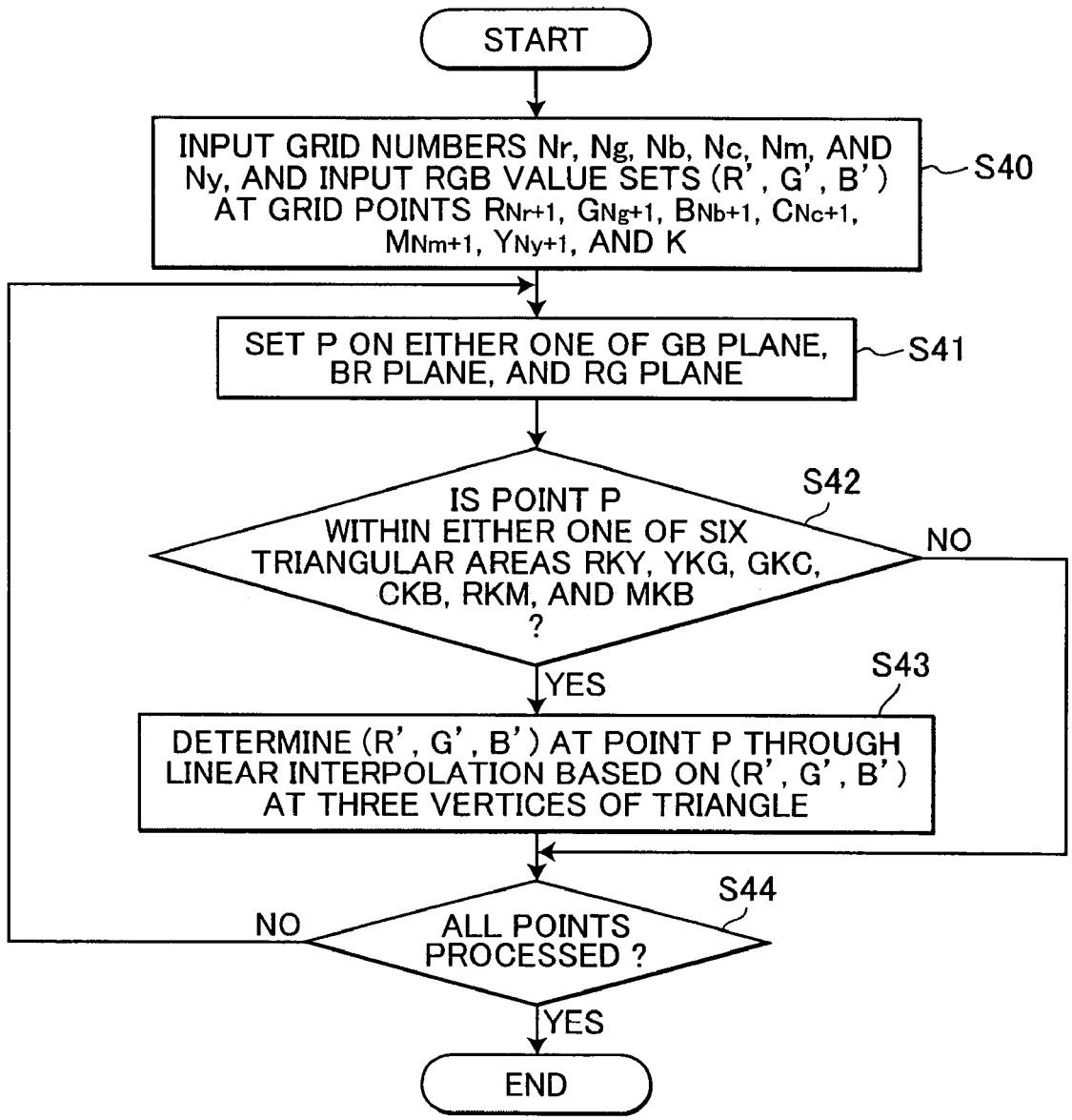
FIG. 11 is a flowchart of an additional correction process for correcting, through interpolation, the values at those grid points that are located between the R-, G-, B-, C-, M, and Y-axes, and that should be corrected.

During the table correcting process T3, the manufacturer controls his/her computer to execute: a grid searching process shown in FIG. 7; a grid correcting process shown in FIG. 8; and an additional grid correcting process shown in FIG. 11.

During the grid searching process of FIG. 7, the computer searches which grid point in the look-up table for media printing 4d is unsuitable and should be corrected.

That is, first, in S11, data of calorimetric value sets $X_n$(L1*, a1*, b1*) measured for all the PC-printing color samples (X=R, G, B, C, M, and Y, n=0 through 8) and data of calorimetric value sets $X_n$(L0*, a0*, b0*) measured for all the media-printing color samples (X=R, G, B, C, M, and Y, n=0 through 8) is inputted to a RAM of the computer.

Next, S12, either one of R, G, B, C, M, and Y is set in a variable X indicative of an axis to be processed. While the routine of S12-S20 are repeatedly executed, the axes R, G, B, C, M, and Y are set to the variable X successively in this order.

Next, in S13, the variable n indicating the grid number is set to one (1), and a buffer in the RAM is cleared.

Next, in S14, the above-described equation (1) is used to calculate a color difference $\Delta E\_X_n$ for the present grid number n between the color value set $X_n$(L1*, a1*, b1*) for PC printing and the color value set $X_n$(L0*, a0*, b0*) for media printing.

Next, in S15, it is judged whether or not the color difference $\Delta E\_X_n$ is greater than the threshold value 3.2.

If the color difference $\Delta E\_X_n$ is greater than the threshold value 3.2 (Yes in S15), in S16, the present grid number n is stored in the buffer provided in the RAM. Then, the program proceeds to S17.

On the other hand, if the color difference $\Delta E\_X_n$ is smaller than or equal to the threshold value 3.2 (No in S15), the program proceeds directly from S15 to S17.

In S17, the grid number n is incremented by one (1).

Next, in S18, it is judged whether or not the present grid number n is greater than or equal to nine (9). That is, it is judged whether or not all the grid points $X_1$-$X_8$ on the present axis have been processed.

If the grid number n has not yet reached nine (9) (No in S18), it is known that there are still some grid points $X_n$ on the present axis X that has not yet been processed. Accordingly, the program returns to S14.

On the other hand, when the grid number n has reached nine (9) (Yes in S18), it is known that all of the grid points $X_1$-$X_8$ on the present axis X have been processed. Accordingly, the program proceeds to S19, wherein the maximum within the grid numbers n that are now being stored in the buffer is determined, and is set as a maximum unsuitable-grid number Nx for the present color axis X.

It is noted that if no grid number n is stored in the buffer, it is known that there is no grid $X_n$, whose RGB value sets (R', G', B') are unsuitable, on the present axis X. Accordingly, in S19, the number zero (0) is set as the maximum unsuitable-grid number Nx. In this case, it is known that RGB value sets (R', G', B') at all the grid points from the first to eighth grid points on the present color axis X are acceptable. It is unnecessary to correct RGB value sets (R', G', B') at any grids on the present color axis X.

It is noted that if at least one grid number n is stored in the buffer, it is known that there is at least one grid $X_n$, whose RGB value sets (R', G', B') are unsuitable. Accordingly, in S19, the maximum number among the at least one grid number n, which is greater than or equal to one (1), is set as the maximum unsuitable-grid number Nx. In this case, the maximum unsuitable-grid number Nx is set greater than or equal to one (1). Accordingly, it is known that on the present color axis X, RGB value sets (R', G', B') from the (Nx+1)-th to eighth grid points are acceptable, but the RGB value set (R', G', B') at least one grid point within the first through Nx-th grid points are unacceptable. The RGB value set (R', G', B') at least the Nx-th grid is unacceptable.

It is therefore known that in order to prevent occurrence of tone jumping and hue shifts in the dark area on the present axis X, RGB value sets (R', G', B') from the first to Nx-th grid points should be corrected through interpolation based on the RGB value set (R', G', B') at the zero(0)-th grid point and based on the RGB value set (R', G', B') at the (Nx+1)-th grid.

It is noted that the zero(0)-th grid point is the darkest grid K(0, 0, 0). The (Nx+1)th grid point is located next to the Nx-th grid point on the X axis in a brighter direction, that is, in a direction farther away from the zero(0)-th grid point (darkest grid point K(0, 0, 0)).

Next, it is judged in S20 whether or not the above-described processing has been executed for all the R-, G-, B-, C-, M-, and Y-axes.

If there is any color axis for which the processing has not yet been executed (No in S20), the flow returns to S12.

On the other hand, when the processing for all the R-, G-, B-, C-, M-, and Y-axes has been completed (Yes in S20), the processing ends.

Thus, the range of grids from the darkest point, whose RGB values (R', G', B') should be corrected through interpolation, is determined for each of all the R-, G-, B-, C-, M-, and Y-axes.

<Grid Correcting Process of FIG. 8>

When the above-described grid searching process of FIG. 7 is completed, the grid correcting process of FIG. 8 is executed.

During the grid correcting process of FIG. 8, on each color axis X whose maximum-unsuitable grid number Nx is greater than zero (0), RGB value sets (R', G', B') at the first through Nx-th grid points are corrected through a linear interpolation based on the RGB value sets (R', G', B') at the 0-th grid point and the (Nx+1)-th grid point.

More specifically, first, in S30, either one of the values R, G, B, C, M, and Y is set to the variable X indicative of the color axis. As the routine of S30-S36 are executed repeatedly, the values R, G, B, C, M, and Y are set to the variable X successively in this order.

Next, in S31, it is judged whether or not the maximum-unsuitable grid number Nx for the present axis X is greater than zero (0).

If the maximum-unsuitable grid number Nx is equal to zero (0) (no in S31), it is known that there is no unsuitable grid point in the present axis X. It is unnecessary to correct RGB value sets (R', G', B') in the look-up-table for media printing 4d at all the grid points on the present color axis X. Accordingly, the flow proceeds to the processing of S36.

On the other hand, if the value Nx is greater than zero (0) (Yes in S31), it is known that it is necessary to correct RGB value sets (R', G', B') at first through Nx-th grids on the present axis X.

Accordingly, if the value Nx is greater than zero (0) (Yes in S31), the process proceeds to S32, in which the grid number n is initialized to one (1).

Then, in S33, a linear interpolation calculation is executed to determine the RGB value set (R', G', B') at the n-th grid point $X_n$ on the present X axis, based on the RGB value set (R', G', B') at the (Nx+1)-th grid point on the X axis and the RGB value set (R', G', B') at the darkest grid point K (the (0)-th grid point on the X axis).

Next, in S34, the grid number n is incremented by one (1).

Then, in S35, it is judged whether or not the grid number n exceeds the maximum-unsuitable grid number Nx for the present axis X.

If n does not yet exceed Nx (No in S35), the flow returns to the processing of S33 to perform the above-described interpolation calculations at the present n-th grid point.

On the other hand, if n exceeds the value Nx (Yes in S35), correction for the present color axis X ends.

Then, in S36, it is judged whether or not the correction processing has been completed for all the color axes.

If the processing has not yet been completed for all the axes (No in S36), the flow returns to the processing of S30.

On the other hand, if processing has been executed for all the color axes (Yes in S36), this processing ends.

In this way, RGB value sets (R', G', B') are corrected at all the grids that should be corrected on the R, G, B, C, M, and Y color axes.

Figure 9:
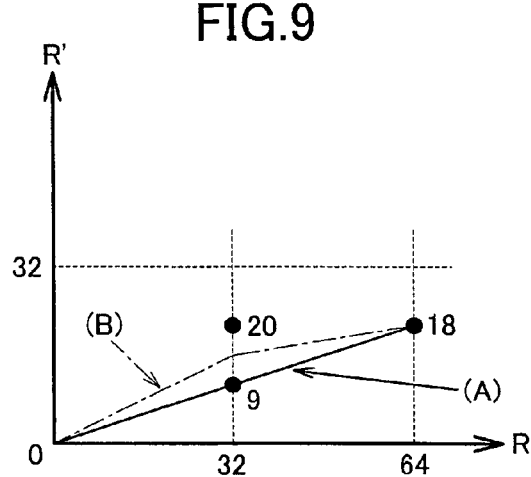
FIG. 9 illustrates a method of correcting, through interpolation, values at the grid points that are located on the R-, G-, B-, C-, M, and Y-axes and that should be corrected.

Now assume that the value Nr is set equal to one (1) in S19. In this case, the RGB value set (R', G', B') at the first grid point $R_1$(32, 0, 0) on the R axis is corrected in S33 through linear interpolation based on the RGB value set (R', G', B') at the second grid point $R_2$(64, 0, 0) and the RGB value set (R', G', B') at the 0th grid point $R_0$(0, 0, 0) (=K(0, 0, 0)). Now assume that as shown in FIG. 9, the value R' at the 0th grid $R_0$(0, 0, 0) is equal to zero (0), the value R' at the first grid $R_1$(32, 0, 0) is equal to 20, and the value R' at the second grid $R_2$(64, 0, 0) is equal to 18.

In this case, as illustrated by a line A in the figure, the value R' at the first grid $R_1$(32, 0, 0) is corrected from 20 to 9 (=18/2) through linear interpolation based on the value R' of zero at the 0th grid R0 (0, 0, 0) and the value R' of 18 at the second grid $R_1$(32, 0, 0).

In this way, the RGB value set (R', G', B') at the first grid $R_1$(32, 0, 0) is corrected into a suitable value set that can prevent occurrence of undesirable tone-jumping and undesirable hue shifts on the red axis.

It is noted that in S33, instead of executing the linear interpolation calculation, a polynomial interpolation calculation can be employed in a manner described below.

That is, first, a polynomial is determined that passes through three or more grid points on the present axis X, whose RGB value sets (R', G', B') are determined as acceptable. Then, the polynomial is used to determine suitable values at those grid points whose RGB value sets (R', G', B') are determined as unacceptable. However, the calculations for deriving such a polynomial are complicated. Accordingly, it is preferable to use the above-described linear calculation which is simpler than the polynomial-using method.

Similarly, instead of employing the linear interpolation calculation, a weighted interpolation calculation can be employed in S33 in a manner described below.

Now assume that the value R' for the 0-th grid point (0, 0, 0) is equal to "a", the value R' for the second grid point (64, 0,0) is equal to "b". A weighting coefficient is set to α (wherein $1 \geq \alpha \geq 0$). In this case, the value R' for the first grid point (32, 0, 0) is corrected by using the following formula:

R' for the first grid point (32, 0, 0)=$[\alpha \times a+(1-\alpha) \times b]/2$.

Now assume that in the same manner as described above, the value R' at the 0th grid $R_0$(0, 0, 0) is equal to zero (0), the value R' at the first grid $R_1$(32, 0, 0) is equal to 20, and the value R' at the second grid $R_2$(64, 0, 0) is equal to 18 as shown in FIG. 9. In this case, as indicated by a broken line B in the figure, the value R' at the first grid $R_1$ is corrected from 20 to the value of $[\alpha \times 0+(1-\alpha) \times 18]/2$.

Figure 10A:
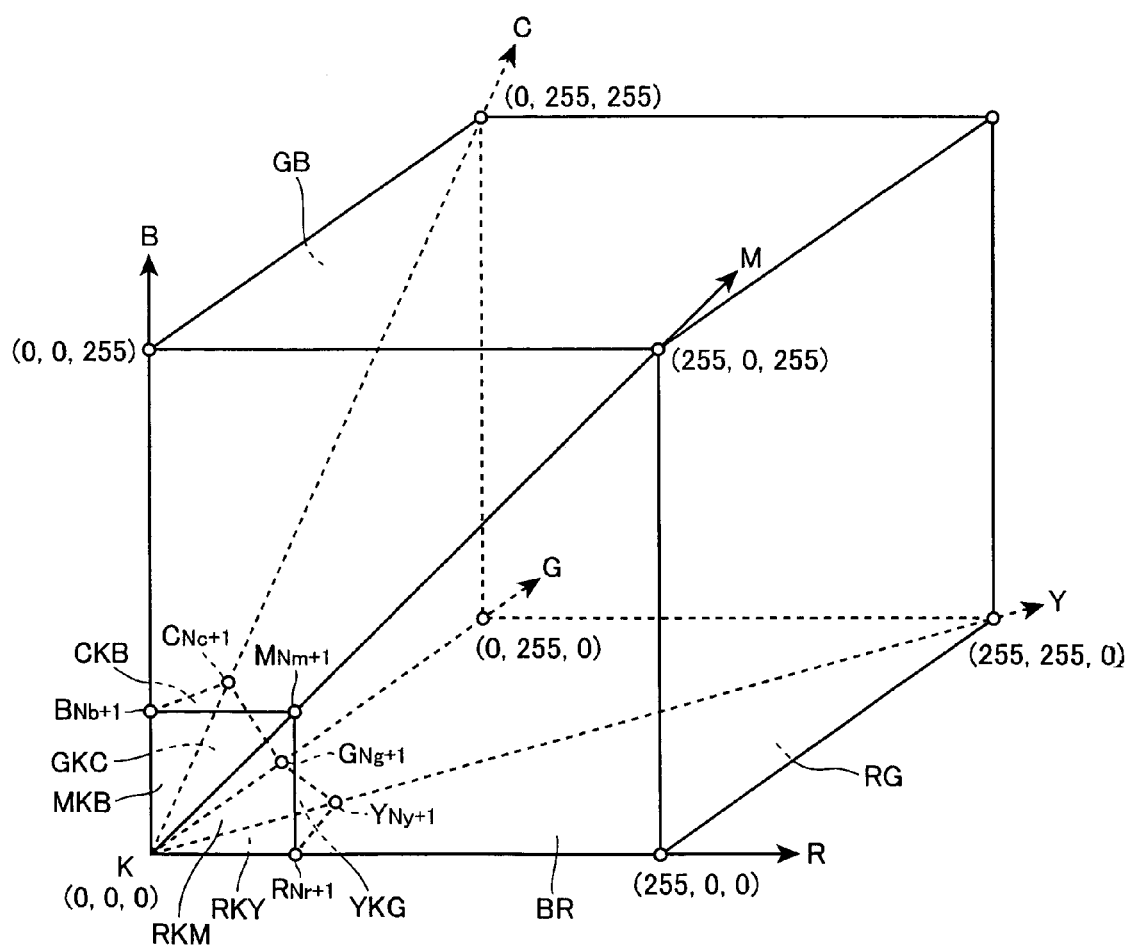
FIG. 10(a) illustrates how to determine grid points that are located between the R-, G-, B-, C-, M, and Y-axes, and that should be corrected.

FIG. 10(a) shows the entire RGB color space, which is of the cubic shape. A GB plane is defined as being formed by the G- and B-axes; a BR plane is defined as being formed by the B- and R-axes; and an RG plane is defined as being formed by the R- and G-axes, as shown in FIG. 10(a).

The (Nr+1)-th grid point "$R_{Nr+1}$" on the R-axis, the (Ng+1)-th grid point on the G-axis "$G_{Ng+1}$", the (Nb+1)-th grid "$B_{Nb+1}$" on the B-axis, the (Nc+1)-th grid point "$C_{Nc+1}$" on the C-axis, the (Nm+1)-th grid point "$M_{Nm+1}$" on the M-axis, the (Ny+1)-th grid point "$Y_{Ny+1}$" on the Y-axis, and the origin grid point K(0, 0, 0) are shown in FIG. 10(a). The RGB value sets (R', G', B') at those grid points are determined as acceptable.

As shown in FIG. 10(a), two triangles RKY and YKG are defined on the RG plane. The triangle RKY is defined by three grid points $R_{Nr+1}$, K, and $Y_{Ny+1}$. The triangle YKG is defined by three grid points $Y_{Ny+1}$, K, and $G_{Ng+1}$. Two triangles GKC and CKB are defined on the GB plane. The triangle GKC is defined by three grid points $G_{Ng+1}$, K, and $C_{Nc+1}$. The triangle CKB is defined by three grid points $C_{Nc+1}$, K, and $B_{Nb+1}$. Two triangles RKM and MKB are defined on the BR plane. The triangle RKM is defined by three grid points $R_{Nr+1}$, K, and $M_{Nm+1}$. The triangle MKB is defined by three grid points $M_{Nm+1}$, K, and $B_{Nb+1}$.

Through the above-described grid correcting process of FIG. 8, the RGB value sets (R', G', B') at the grid points $R_1$-$R_{Nr}$ are corrected through interpolation based on the RGB value sets (R', G', B') at the grid points K and $R_{Nr+1}$. Similarly, the RGB value sets (R', G', B') at the grid points $G_1$-$G_{Ng}$ are corrected through interpolation based on the RGB value sets (R', G', B') at the grid points K and $G_{Ng+1}$. The RGB value sets (R', G', B') at the grid points $B_1$-$B_{Nb}$ are corrected through interpolation based on the RGB value sets (R', G', B') at the points K and $B_{Nb+1}$. Similarly, the RGB value sets (R', G', B') at the grid points $C_1$-$C_{Nc}$ are corrected through interpolation based on the RGB value sets (R', G', B') at the grid points K and $C_{Nc+1}$. The RGB value sets (R', G', B') at the grid points M1-$M_{Nm}$ are corrected through interpolation based on the RGB value sets (R', G', B') at grid points K and $M_{Nm+1}$. Similarly, the RGB value sets (R', G', B') at the grid points $Y_1$-$Y_{Ny}$ are corrected through interpolation based on the RGB value sets (R', G', B') at the grid points K and $Y_{Ny+1}$.

In other words, with respect to the triangle RKY, the RGB value sets (R', G', B') at the grid points that are located on one side between the vertices K and $R_{Nr+1}$ are corrected through interpolation based on the RGB value sets (R', G', B') at the vertices K and $R_{Nr+1}$, and the RGB value sets (R', G', B') at the grid points on another side between the vertices K and $Y_{Ny+1}$ are corrected through interpolation based on the RGB value sets (R', G', B') at the vertices K and $Y_{Ny+1}$.

If Nr is greater than or equal to two (2) and Ny is greater than or equal to two (2), there exists at least one grid point that falls within the triangle RKY. That is, if Nr is equal to two (2) and Ny is equal to two (2), there exists one grid point (64, 32, 0) within the triangle RKY. In order to prevent tone jumping and hue shifts from occurring between the grid points on the sides of the triangle and the grid points within the triangle RKY, the RGB value sets (R', G', B') at the grid points within the triangle RKY should be corrected through interpolation based on the RGB value sets (R', G', B') at the three vertices of the triangle RKY, that is, grid points $R_{Nr+1}$, K, and $Y_{Ny+1}$.

Similarly, the RGB value sets (R', G', B') at grid points within the triangle YKG should be corrected through interpolation based on the RGB value sets (R', G', B') at the three vertices of the triangle YKG, that is, grid points $Y_{Ny+1}$, K, and $G_{Ng+1}$.

Similarly, the RGB value sets (R', G', B') at grid points within the triangle GKC should be corrected through interpolation based on the RGB value sets (R', G', B') at the three vertices of the triangle GKC, that is, grid points $G_{Ng+1}$, K, and $C_{Nc+1}$. The RGB value sets (R', G', B') at grid points within the triangle CKB should be corrected through interpolation based on the RGB value sets (R', G', B') at the three vertices of the triangle CKB, that is, grid points $C_{Nc+1}$, K, and $B_{Nb+1}$.

Similarly, the RGB value sets (R', G', B') at grid points within the triangle RKM should be corrected through interpolation based on the RGB value sets (R', G', B') at the three vertices of the triangle RKM, that is, grid points $R_{Nr+1}$, K, and $M_{Nm+1}$. The RGB value sets (R', G', B') at grid points within the triangle MKB should be corrected through interpolation based on the RGB value sets (R', G', B') at the three vertices of the triangle MKB, that is, grid points $M_{Nm+1}$, K, and $B_{Nb+1}$.

Figure 10B:
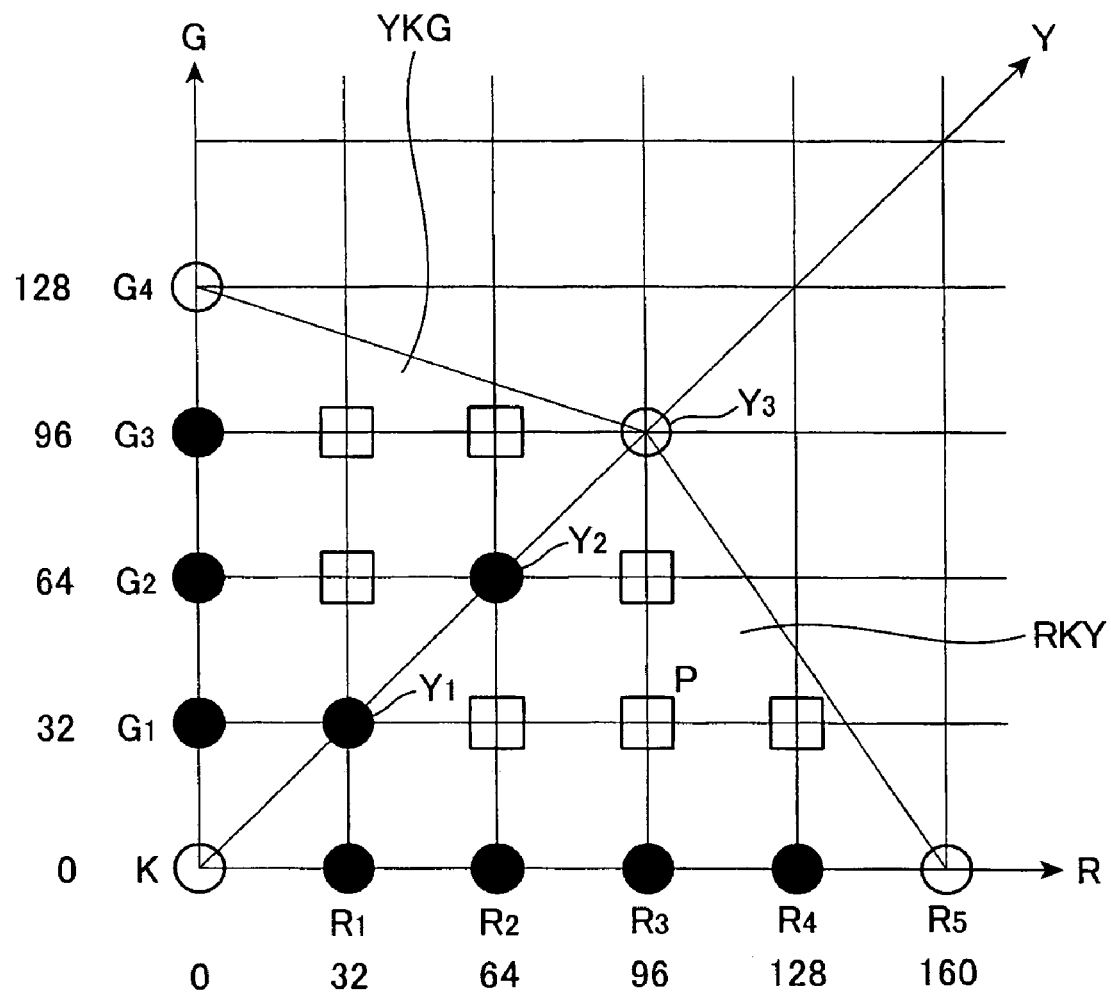
FIG. 10(b) shows examples of grid points that are located between the R- and Y-axes or between the Y- and G-axes and that should be corrected.

FIG. 10(b) shows one example, in which the maximum-unsuitable grid number Nr for the red axis R is set equal to 4, the maximum-unsuitable grid number Ny for the yellow axis Y is set equal to 2, and the maximum-unsuitable grid number Ng for the green axis G is set equal to 3. It is noted that the axis B extends perpendicularly to the sheet of the drawing from the origin grid point K(0, 0, 0).

As indicated by hollow circles, RGB value sets (R', G', B') at the (Nr+1)-th grid point $R_5$(160, 0, 0) on the R-axis, at the (Ny+1)-th grid point $Y_3$(96, 96, 0) on the Y-axis, and at the (Ng+1)-th grid point $G_4$(0, 128, 0) on the G-axis are determined suitable. The triangle RKY is defined by the grid points $R_5$(160, 0, 0), K(0, 0, 0), and $Y_3$(96, 96, 0), and the triangle YKG is defined by the grid points $Y_3$(96, 96, 0), K(0, 0, 0), and $G_4$(0, 128, 0)

As indicated by solid circles in this figure, the RGB value sets (R', G', B') at four grid points $R_1$(32, 0, 0), $R_2$(64, 0, 0), $R_3$(96, 0, 0), and $R_4$(128, 0, 0) on the R-axis are corrected through interpolation based on the RGB value sets (R', G', B') at the grid points K (0, 0, 0) and R5(160, 0, 0). The RGB value sets (R', G', B') at two grid points $Y_1$(32, 32, 0) and $Y_2$(64, 64, 0) on the Y-axis are corrected through interpolation based on the RGB value sets (R', G', B') at the grid points K (0, 0, 0) and $Y_3$(96, 96, 0). The RGB value sets (R', G', B') at three grid points $G_1$(0, 32, 0), $G_2$(0, 64, 0), and $G_3$(0, 96, 0) are corrected through interpolation based on the RGB value sets (R', G', B') at the grid points K (0, 0, 0) and $G_4$(0, 128, 0).

In this case, as indicated by hollow squares, four grid points (64, 32, 0), (96, 32, 0), (128, 32, 0), and (96, 64, 0) are located within the triangle RKY. Accordingly, the RGB value sets (R', G', B') at the four grid points (64, 32, 0), (96, 32, 0), (128, 32, 0), and (96, 64, 0) should be corrected through interpolation based on the RGB value sets (R', G', B') at the three vertices K(0, 0, 0), $R_5$(160, 0, 0), and $Y_3$(96, 96, 0) of the triangle RKY.

Similarly, as indicated by hollow squares, three grid points (32, 64, 0), (32, 96, 0), and (64, 96, 0) are located within the triangle YKG. Accordingly, the RGB value sets (R', G', B') at the three grid points (32, 64, 0), (32, 96, 0), and (64, 96, 0) should be corrected through interpolation based on the RGB value sets (R', G', B') at the three vertices K(0, 0, 0), $Y_3$(96, 96, 0), and $G_4$(0, 128, 0) of the triangle YKG.

According to the present embodiment, the additional grid correcting process of FIG. 11 is executed to judge whether or not some grid point falls within either one of the six triangles RKY, YKG, GKC, CKB, RKM, and MKB shown in FIG. 10(a) and to correct the RGB value set (R', G', B') at the grid point that falls within some triangle through interpolation based on the RGB value sets (R', G', B') at three vertices of the subject triangle.

It is noted that one or more grid point will fall within one triangle RKY, YKG, GKC, CKB, RKM, or MKB when at least two successive grid points are corrected along both sides of the triangle.

<Additional Grid Correcting Process of FIG. 11>

The additional grid correcting Process of FIG. 11 will be described below in greater detail.

First, in S40, data of the maximum-unacceptable grid numbers Nr, Ng, Nb, Nc, Nm, and Ny is inputted to the RAM of the computer. In addition, data of RGB value sets (R', G', B') at the grid points $R_{Nr+1}$, $G_{Ng+1}$, $B_{Nb+1}$, $C_{Nc+1}$, $M_{Nm+1}$, $Y_{Ny+1}$, and K are inputted to the RAM. Six triangles RKY, YKG, GKC, CKB, RKM, and MKB are defined by the grid points $R_{Nr+1}$, $G_{Ng+1}$, $B_{Nb+1}$, $C_{Nc+1}$, $M_{Nm+1}$, $Y_{Ny+1}$, and K.

Next, in S41, one grid point within either one of the planes GB, BR, and RG is set as point P to be processed. While the processes of S41-S44 are repeated, the grid point P is set in succession to all the grid points within the planes GB, BR, and RG.

Next, in S42, it is determined whether or not the present grid point P is located within either one of the six triangular areas RKY, YKG, GKC, CKB, RKM, and MKB.

If the point P is within one of the triangular areas RKY, YKG, GKC, CKB, RKM, and MKB (Yes in S42), in S43, an RGB value set (R', G', B') at the point P is calculated through linear interpolation based on the RGB value sets (R', G', B') at the three grid points that serve as the three vertices of the subject triangle.

Figure 12:
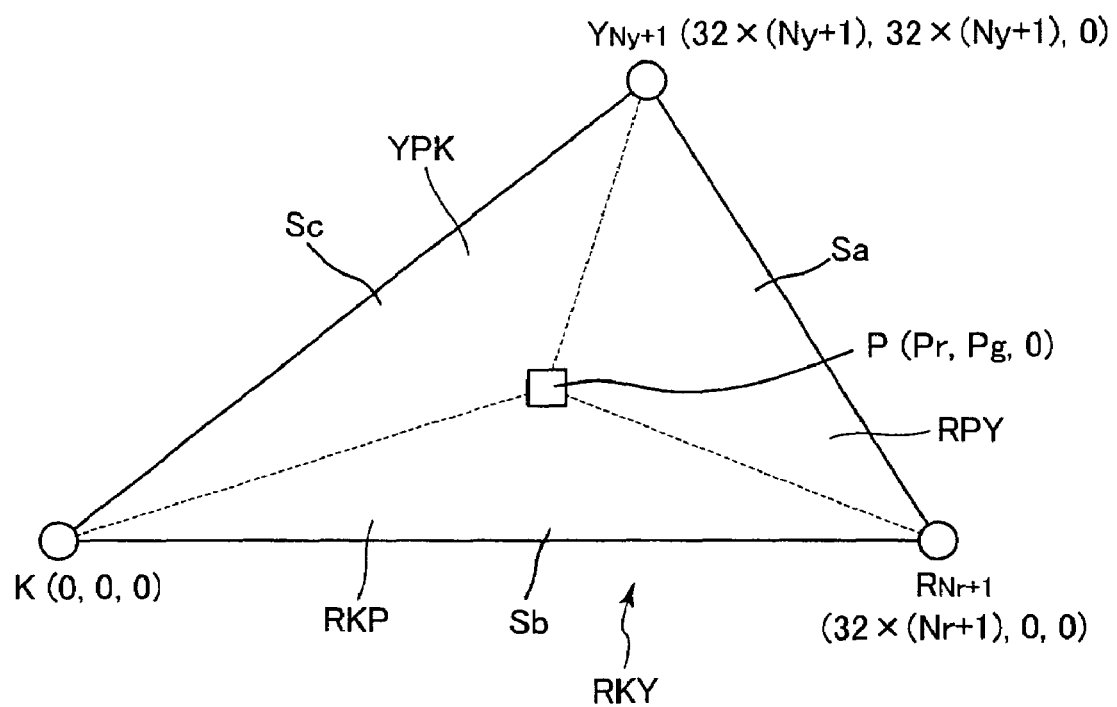
FIG. 12 illustrates how to determine the values at a point within a triangle through a linear interpolation.

More specifically, now assume that the point P is within the triangular area RKY as shown in FIG. 12. The RGB coordinate values for the grids $R_{Nr+1}$ and $Y_{Ny+1}$ are (32×(Nr+1), 0, 0), and (32×(Ny+1), 32×(Ny+1), 0), respectively. Now assume that the RGB coordinate values for the point P are indicated by (Pr, Pg, 0). The triangular area RKY has three smaller triangular areas: a triangular area RPY defined by the grid points $R_{Nr+1}$, $Y_{Ny+1}$, and P; a triangular area RKP defined by the grid points $R_{Nr+1}$, K, and P; and a triangular area YPK defined by the grid points $Y_{Ny+1}$, P, and K. The triangular areas RPY, RKP, and YPK have the amounts of areas Sa, Sb, and Sc, respectively.

In this case, the RGB value set (R' (P), G'(P), B'(P)) at the grid point P is calculated through linear interpolation by the following formula based on the RGB value set (R'($R_{Nr+1}$), G'($R_{Nr+1}$), B'($R_{Nr+1}$)) at the grid point $R_{Nr+1}$, the RGB value set (R'(K), G'(K), B'(K)) at the origin grid point K, and the RGB value set (R'($Y_{Ny+1}$), G'($Y_{Ny+1}$), B'($Y_{Ny+1}$)) at the grid point $Y_{Ny+1}$:

$$R'(P)=\{(Sa \times R'(K))+(Sb \times R'(Y_{Ny+1}))+(Sc \times R'(R_{Nr+1}))\}/(Sa+Sb+Sc),$$

$$G'(P)=\{(Sa \times G'(K))+(Sb \times G'(Y_{Ny+1}))+(Sc \times G'(R_{Nr+1}))\}/(Sa+Sb+Sc),$$

and $$B'(P)=\{(Sa \times B'(K))+(Sb \times B'(Y_{Ny+1}))+(Sc \times B'(R_{Nr+1}))\}/(Sa+Sb+Sc).$$

The RGB value set (R'(P), G'(P), B'(P)) thus calculated for the grid point P is newly set for the grid point P.

Then, the process proceeds to S44.

On the other hand, if the grid point P is not located within any of the six triangular areas RKY, YKG, GKC, CKB, RKM, and MKB (no in S42), the process proceeds directly from S42 to S44, without calculating the RGB value set (R'$_P$, G'$_P$, B'$_P$) for the grid point P through linear interpolation.

In S44, it is determined whether or not the processing has been completed for all the grid points that are located on the RG plane, the GB plane, and the BR plane.

If there are still any grid points that have not yet been processed (No in S44), the flow returns to the processing of S41, in which a new grid point P that has not yet been processed and that is located within either one of the RG plane, the GB plane, and the BR plane, is newly set. Thus, the processes from S41 to S44 are repeated until all the grid points P on the RG plane, the GB plane, and the BR plane have been processed.

When all the grid points P on the RG plane, the GB plane, and the BR plane have been processed (Yes in S44), the process ends.

The look-up-table for media printing 4d thus corrected through the processes of FIGS. 7, 8, and 11 is stored in T4 in the ROM 4, which in turn is installed in the printer 1.

In the above-described manner, the RGB value sets (R', G', B') in the look-up table for media printing 4d at grid points that are located between the darkest position K(0, 0, 0) and the (Nx+1)-th grid points are corrected through interpolation based on the RGB value sets (R', G', B') at the darkest position K(0, 0, 0) and the (Nx+1)-th grid points. It is therefore possible to prevent tone-jumping and hue shifts from occurring in the dark area.

In order to determine which grid point has an unsuitable RGB value set (R', G', B') in the look-up table for media printing 4d, color samples are printed by both of the PC printing and the media printing. The color samples are measured by a calorimeter. It is judged whether or not a color difference between color samples that are obtained for a single grid point is greater than the predetermined value. When a color difference between color samples that are obtained for some grid point is greater than the predetermined value, the subject grid point is determined as having an unsuitable RGB value set (R', G', B'). Then, the unsuitable RGB value set (R', G', B') at the subject grid point is corrected to suitable RGB value set (R', G', B') that is calculated through interpolation between the RGB value set (R', G', B') at the darkest grid point and the acceptable RGB value set (R', G', B') at the (Nx+1)-th grid point.

<First Modification>

In the above-described embodiment, through the grid searching process of FIG. 7 and the grid correcting process of FIG. 8, the RGB value sets (R', G', B') at the grid points on each axis X between the darkest grid K(0, 0, 0) and the (Nx+1)-th grid point are corrected through interpolation based on the RGB value sets (R', G', B') at the darkest grid point K(0, 0, 0) and the (Nx+1)-th grid point.

Figure 13:
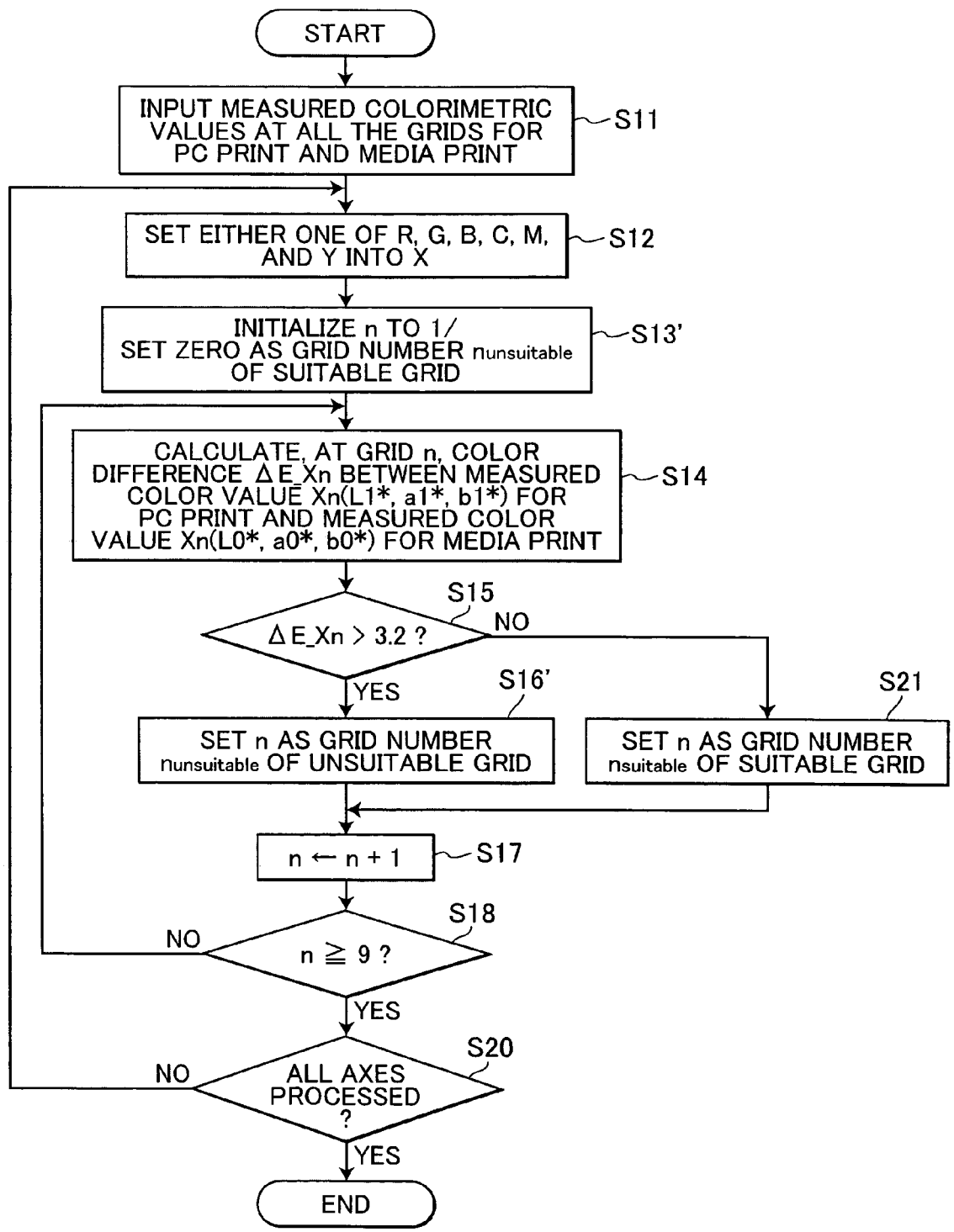
FIG. 13 is a flowchart illustrating a first modification of the grid searching process of FIG. 7.
Figure 14:
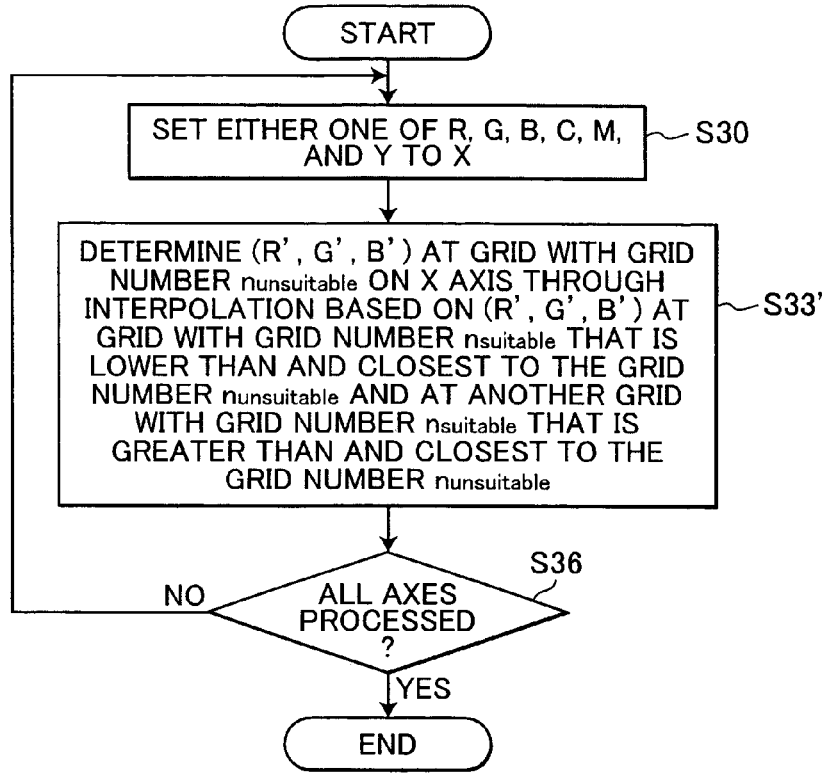
FIG. 14 is a flowchart illustrating a first modification of the grid correcting process of FIG. 8.

However, the grid searching process of FIG. 7 may be modified as shown in FIG. 13, and the grid correcting process of FIG. 8 may be modified as shown in FIG. 14.

The grid searching process of FIG. 13 is the same as that of FIG. 7 except that the process S19 is not executed, that the processes S13 and S16 are modified into processes S13' and S16', and that an additional process S21 is executed when the judgment in S15 is negative (no in S15).

In S13', the buffer clearing process is not executed. Instead, in S13', zero (0) is set as a grid number $n_{suitable}$ indicative of a suitable grid point on the present X axis, and the variable n indicative of the grid number is initialized to one (1).

In S16', the present grid number n is set in the RAM as a grid number $n_{unsuitable}$ indicative of an unsuitable grid point on the present X axis.

In S21, the present grid number n is set in the RAM as a grid number $n_{suitable}$ indicative of a suitable grid point on the present X axis.

The process of FIG. 14 is the same as that of FIG. 8 except that the process S31, S32, S34, or S35 is not executed, and that the process S33 is modified into a process S33'.

In S33', on the present X axis, the RGB value set (R', G', B') at each unsuitable grid with grid number $n_{unsuitable}$ is determined through interpolation based on: the RGB value set (R', G', B') at one adjacent suitable grid point whose grid number $n_{suitable}$ is the closest to the subject grid number $n_{unsuitable}$ among the grid numbers $n_{suitable}$ that are smaller than the present grid number $n_{suitable}$; and the RGB value set (R', G', B') at another adjacent suitable grid point whose grid number $n_{suitable}$ is the closest to the subject grid number $n_{unsuitable}$ among the grid numbers $n_{suitable}$ that are greater than the subject grid number $n_{suitable}$.

More specifically, in S33', for the present X axis, among all the grid numbers n from zero (0) to eight (8), all the grid numbers $n_{unsuitable}$ indicative of unsuitable grid points are selected, and all the grid numbers $n_{suitable}$ indicative of suitable grid points are selected.

Then, for each unsuitable grid with grid number $n_{unsuitable}$, darker suitable grid points, whose grid numbers $n_{suitable}$ are smaller than the subject grid number $n_{unsuitable}$, and brighter suitable grids, whose grid numbers $n_{suitable}$ are greater than the subject grid number $n_{unsuitable}$, are selected. Then, for each unsuitable grid with grid number $n_{unsuitable}$, the following darker-adjacent and brighter-adjacent suitable grid points are selected. The darker-adjacent suitable grid point has a grid number $n_{suitable}$ that is the nearest to the subject grid number $n_{unsuitable}$ from among all the darker suitable grid points. The brighter-adjacent suitable grid point has a grid number $n_{suitable}$ that is the nearest to the subject grid number $n_{unsuitable}$ from among all the brighter suitable grid points. The RGB value set (R', G', B') at each unsuitable grid point is then determined through interpolation based on the RGB value sets (R', G', B') at the selected darker-adjacent and brighter-adjacent suitable grid points.

Now assume that on the R-axis, grid points with grid numbers 0, 4-5, 7, and 8 are determined as suitable in S21, and grid points with grid numbers 1-3 and 6 are determined as unsuitable in S16'. In this case, the RGB value set (R', G', B') at the first through third grid points are determined through interpolation based on the RGB value sets (R', G', B') at the 0-th grid point and at the fourth grid point. The RGB value set (R', G', B') at the sixth grid point is determined through interpolation based on the RGB value sets (R', G', B') at the fifth grid point and at the seventh grid point.

<Second Modification>

Figure 15:
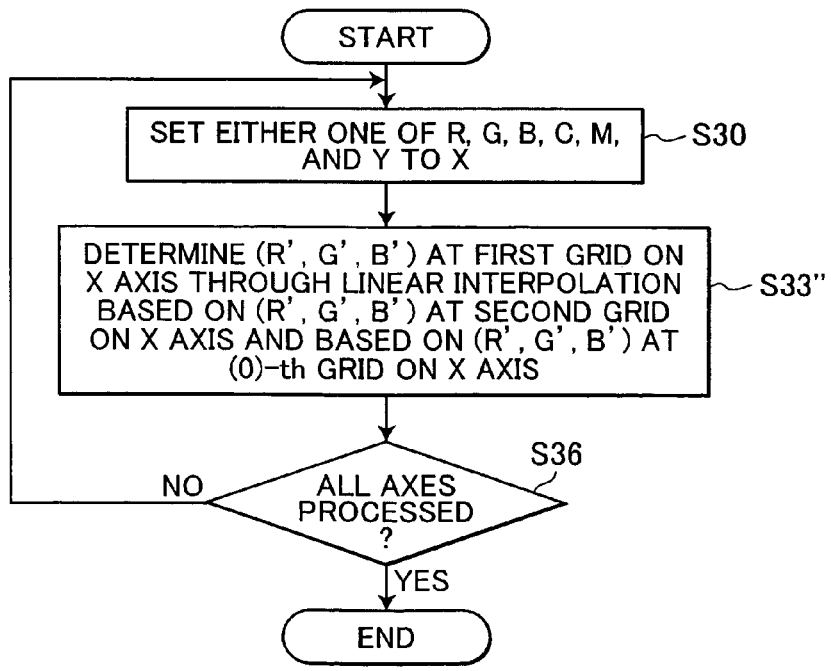
FIG. 15 is a flowchart illustrating a second modification of the grid correcting process of FIG. 8.

The manufacturer may not execute the sample printing and measuring process T2. In T3, the manufacturer may control the computer not to execute the grid searching process of FIG. 7 or the additional grid correcting process of FIG. 11. In this case, the grid correcting process of FIG. 8 is modified as shown in FIG. 15. Accordingly, in T3, only the grid correcting process of FIG. 15 is executed. The grid correcting process of FIG. 15 is executed directly after T1.

The grid correcting process in FIG. 15 is the same as that shown in FIG. 8 except that S31, S32, S34, and S35 are omitted, and that the process S33 is modified into a process of S33".

In the modified process S33", a linear interpolation calculation is executed to determine the RGB value set (R', G', B') at the first grid point $X_1$ on the present X axis, based on the RGB value set (R', G', B') at the second grid point $X_2$ on the X axis and based on the RGB value set (R', G', B') at the (0)-th grid point $X_0$ (darkest grid point K(0, 0, 0)).

For example, the RGB value sets (R', G', B') at the first grid point $R_1$(32, 0, 0) on the R-axis is determined through interpolation based on the RGB value sets (R', G', B') on the second grid point $R_2$(64, 0, 0) on the R-axis and on the RGB value sets (R', G', B') on the 0-th grid point K(0, 0, 0).

It is noted that tone-jumping and hue shifts will most likely occur at the first grid points R1(32, 0, 0), G1(0, 32, 0), B1(0, 0, 32), C1(0, 32, 32), M1(32, 0, 32), and Y1(32, 32, 0) on the respective R, G, B, C, M, and Y axes. By correcting the RGB value sets (R', G', B') at the first grid points on the respective color axes in the manner described above, it is possible to prevent the tone jumping and the hue shifts from occurring at the first grid points. It becomes unnecessary to print color samples, to measure the calorimetric values of the color samples, and to determine which grid point should be corrected. Additionally, the number of times, at which the interpolation calculation is executed, can be reduced. The entire correcting process can be completed within a short period of time.

<Third Modification>

As indicated by a broken line in FIG. 1(a), data 4e of the program of the grid searching process of FIG. 7, data 4f of the grid correcting process of FIG. 8, and data 4g of the additional grid correcting process of FIG. 11 may be additionally stored in the ROM 4 of the printer 1. After having purchased the printer 1, the user might possibly want to modify the characteristics of the look-up table for media printing 4d that is stored in the ROM 4 into his/her desired characteristics.

In such a case, in the same manner as in the sample-printing-and-measuring process T2, the user first controls the printer 1 to print out the plurality of color samples shown in FIG. 6(a) by using the look-up-table for PC printing 24c and to print out the plurality of color samples shown in FIG. 6(b) by using the look-up-table for media printing 4d. The user uses his/her calorimeter to read the calorimetric values of the color samples. Then, in the same manner as in the process T3, the user executes the programs 4e, 4f, and 4g in the printer 1 to perform the processes of FIGS. 7, 8, and 11 in this order to modify the RGB value sets (R', G', B') at necessary grid points in the look-up table for media printing 4d. It is noted that user inputs in S11 the measured colorimetric values of the color samples in the printer 1 via the USB interface 5. In the same manner as in the process T4, data of the corrected look-up-table for media printing 4d is stored in a memory device (not shown) that is mounted in the printer 1. When the user instructs the printer 1 to execute the media printing of FIG. 3(b) thereafter, the media printing will be executed by using the thus corrected look-up-table for media printing 4d that is now stored in the memory device. The corrected look-up table for media printing 4d can exhibit the user's desired characteristics. By using the thus corrected look-up table for media printing 4d during the media printing, the user can obtain, through media printing, images whose color states suit the user's preferences.

In this modification, the manufacturer may not execute the processes of T2 or T3, but may store in T4 the look-up table for media printing 4d that has been created in T1 but that has not been corrected in T2 and T3. The user executes the processes of T2 and T3 to correct the look-up table for media printing 4d.

Figure 16:
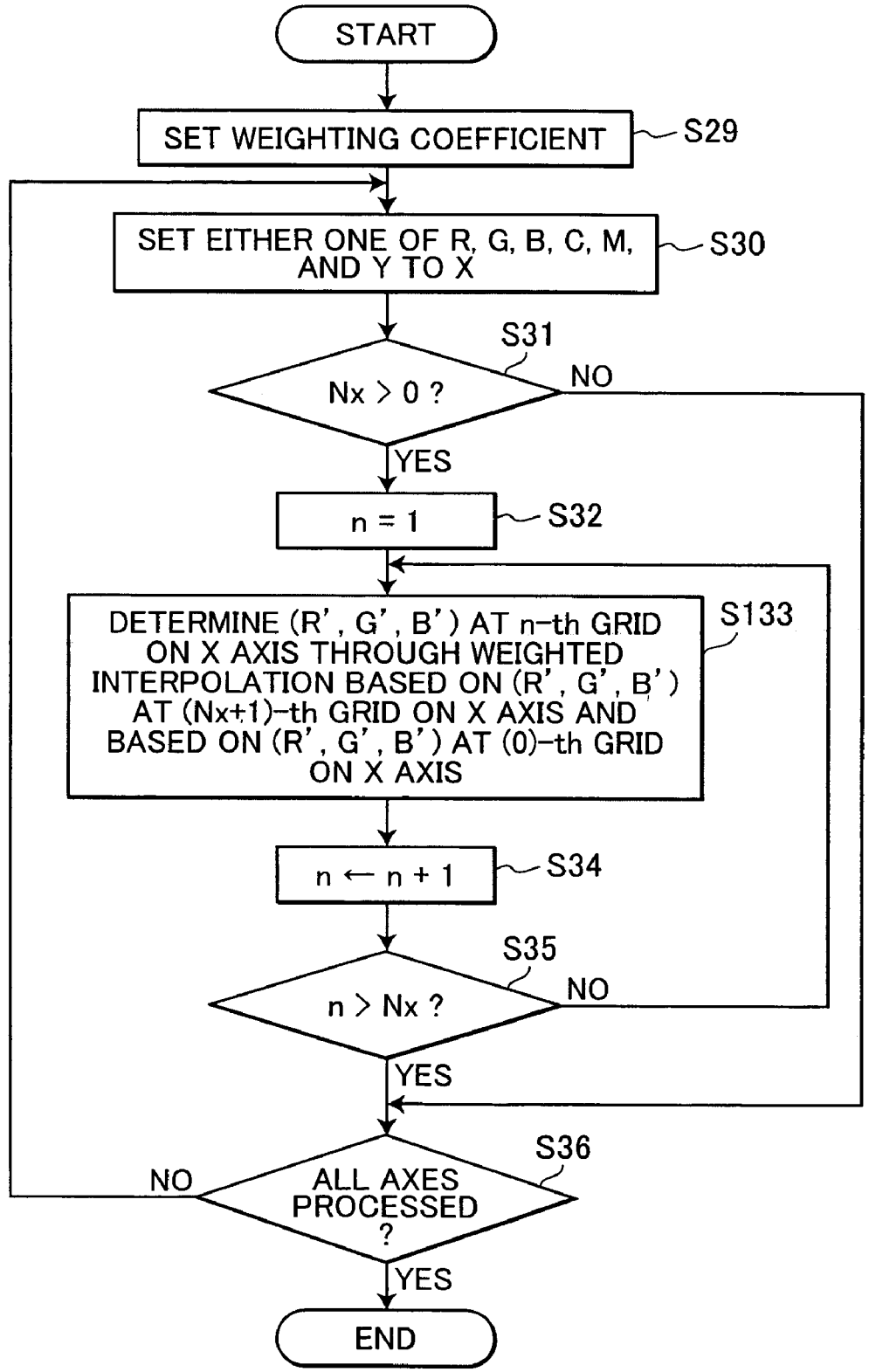
FIG. 16 is a flowchart illustrating a third modification of the grid correcting process of FIG. 8.

Additionally, in this modification, the grid correcting process of FIG. 8 may be modified as shown in FIG. 16. The grid correcting process of FIG. 16 is the same as that of FIG. 8 except that an initializing process S29 is added and S33 is modified into S133. In S133, the weighted interpolation is executed.

In this case, the printer 1 is configured to enable the user to set his/her desired value for the weighting coefficient α. For example, the display 34 of the operating panel 30 shows several values for the weighting coefficient α. The user can manipulate the cursor keys 35 to move the cursor to select his/her desired value for the weighting coefficient α. Or, a special control device, such as a knob, may be provided on the printer 1 to setting the weighting coefficient α. The user can set the weighting coefficient α to his/her desired value.

The user instructs the printer 1 to execute the programs 4e-4g, after setting the weighting coefficient α to his/her desired value. The user's set weighting coefficient α is set in the initializing process of S29. In S133, the weighted interpolation is executed by using the user's set weighting coefficient α.

While the invention has been described in detail with reference to the specific embodiment thereof, it would be apparent to those skilled in the art that various changes and modifications may be made therein without departing from the spirit of the invention.

For example, in the above-described embodiment, the look-up table for media printing 4d is in the form of converting RGB image data (Rin, Gin, Bin) into corrected RGB image data (Rin', Gin', Bin'). The CMY image data (Cin, Min, Yin) is obtained by performing the predetermined calculation based on the RGB image data (Rin', Gin', Bin').

However, as shown in FIG. 17, the look-up table for media printing 4d may be modified into the form of converting RGB image data (Rin, Gin, Bin) directly into CMY image data (Cin, Min, Yin) by combining together the conversion from RGB image data (Rin, Gin, Bin) into corrected RGB image data (Rin', Gin', Bin') and the conversion from RGB image data (Rin', Gin', Bin') to CMY image data (Cin, Min, Yin), wherein Cin=255−Rin', Min=255−Gin', and Yin=255−Bin'.

In the above-described embodiment, the external medium is inserted into one of the external media slots 6 provided in the printer 1. However, the printer 1 may be provided with no external media slots 6. Instead, the printer 1 is provided with an additional input terminal, which is in turn connected to an external media reader. The RGB image data is read from the external medium by the external media reader, which in turn supplies the RGB image data to the printer 1 via the additional input terminal.

It is noted that together with the data of the color conversion program 24b and the look-up tables for PC printing 24c, data of the color conversion program 4a for media printing, the print control program 4b, the UCR curves 4c, the look-up tables for media printing 4d, the program 4e of the grid searching process of FIG. 7 or 13, the program 4f of the grid correcting process of FIG. 8, 14, 15, or 16, and the program 4g of the additional grid correcting process of FIG. 11 may be originally stored on a data storage medium, such as a CD-ROM or the like. The data storage medium is attached to the printer 1. The printer 1 thus attached with the data storage medium is shipped from the manufacturer. When the user purchases the printer 1, the user reads out the data of the programs 4a, 4b, 4e, 4f, and 4g, the UCR curves 4c, and the look-up tables for media printing 4d from the data storage medium, and store the data in the memory device (not shown) mounted in the printer 1. Or, these data may be downloaded to the printer 1 directly from the network such as the Internet.

What is claimed is:

1. An image processing method, comprising:
    receiving an input value combination that includes a plurality of input values for a plurality of primary colors and that is indicative of image information;
    converting the input value combination into a first output value combination, the first output value combination including a plurality of output values for a plurality of printing-components including black,
    the converting the input value combination into the first output value combination including:
        converting, by using a first conversion table, the received input value combination into an intermediate value combination that includes a plurality of intermediate values for a plurality of intermediate components,
        the first conversion table defining a plurality of grid points that are arranged in a predetermined color space, in which the input value combination is located, the plurality of grid points being in one-to-one correspondence with a plurality of different primary-color-value combinations for the plurality of primary colors,
        the grid points including a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively,
        the first conversion table listing up an intermediate-component-value combination at each grid point, the intermediate-component-value combination, at at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point;
        setting the output value for black based on the intermediate value combination; and
        setting the output values for the other printing-components based on the output value for black; and
    printing the first output value combination.

2. The image processing method as claimed in claim 1, wherein the plurality of intermediate components are the same as the plurality of primary colors.

3. The image processing method as claimed in claim 1, wherein the plurality of intermediate components are the same as the plurality of printing-components other than black.

4. The image processing method as claimed in claim 1, further comprising receiving a second output value combination, the second output value combination including a plurality of output values for the plurality of printing-components including black, the second output value combination being determined by converting the input value combination by using a second conversion table, the second conversion table listing up a plurality of printing-component-value combinations in one-to-one correspondence with a plurality of primary-color-value combinations;
    wherein either one of the first output value combination and the second output value combination is printed.

5. The image processing method as claimed in claim 1, wherein the value N is one (1).

6. The image processing method as claimed in claim 1, wherein the intermediate-component-value combination at the at least one grid point between the darkest grid point and the (N+1)-th grid point is determined through linear interpolation based on the intermediate-component-value combinations at the darkest grid point and at the (N+1)-th grid point.

7. The image processing method as claimed in claim 1, wherein the intermediate-component-value combination at the at least one grid point between the darkest grid point and the (N+1)-th grid point is determined through weighted interpolation based on the intermediate-component-value combinations at the darkest grid point and at the (N+1)-th grid point and based on a weighting coefficient.

8. The image processing method as claimed in claim 1, wherein the plurality of primary colors are made up from first through third different primary colors, the plurality of grid points being arranged in the predetermined color space, in which first through third axes of the first through third different primary colors extend in three different directions from the darkest grid point, wherein the grid points include a plurality of grid points that are successively arranged on the first axis from the darkest grid point, the grid points on the first axis including an N1-th grid point and an (N1+1)-th grid point that are located N1-th and (N1+1)-th among the plurality of grid points on the first axis, the intermediate-component-value combination, at at least one grid point that is located between the darkest grid point and the (N1+1)-th grid point along the first axis, being determined through interpolation based on the intermediate-component-value combinations at the darkest grid point and at the (N1+1)-th grid point on the first axis, wherein the grid points include a plurality of grid points that are successively arranged on the second axis from the darkest grid point, the grid points on the second axis including an N2-th grid point and an (N2+1)-th grid point that are located N2-th and (N2+1)-th among the plurality of grid points on the second axis, the intermediate-component-value combination, at at least one grid point that is located between the darkest grid point and the (N2+1)-th grid point along the second axis, being determined through interpolation based on the intermediate-component-value combinations at the darkest grid point and at the (N2+1)-th grid point on the second axis, and wherein the grid points include a plurality of grid points that are successively arranged on the third axis from the darkest grid point, the grid points on the third axis including an N3-th grid point and an (N3+1)-th grid point that are located N3-th and (N3+1)-th among the plurality of grid points on the third axis, the intermediate-component-value combination, at at least one grid point that is located between the darkest grid point and the (N3+1)-th grid point along the third axis, being determined through interpolation based on the intermediate-component-value combinations at the darkest grid point and at the (N3+1)-th grid point on the third axis.

9. The image processing method as claimed in claim 1, wherein the value N is determined dependently on a plurality of color differences between a plurality of first sample images and a plurality of second sample images, the plurality of first sample images being printed based on a plurality of sets of first output combination, which are determined based on a plurality of input value combinations at a plurality of grid points, the plurality of grid points being successively arranged in the predetermined direction, the plurality of second sample images being printed based on a plurality of sets of second output combination that are determined based on the plurality of input value combinations.

10. An image processing method, comprising:

preparing a first conversion table, the first conversion table defining a plurality of grid points that are arranged in a predetermined color space, the plurality of grid points being in one-to-one correspondence with a plurality of different primary-color-value combinations, each primary-color-value combination including a plurality of values for the plurality of primary colors, the grid points including a darkest grid point that is indicative of a darkest point among all the grid points, the grid points further including several grid points that are successively arranged in a predetermined direction from the darkest grid point, the first conversion table listing up an intermediate-component-value combination at each grid point, the intermediate-component-value combination including a plurality of intermediate values for a plurality of intermediate components;

printing several first sample images, by converting several primary-color-value combinations, which correspond to the several grid points, into several first output value combinations, each first output value combination including a plurality of output values for the plurality of printing-components including black, the printing each of the several first sample images including:

converting, by using the first conversion table, the corresponding primary-color-value combination into an intermediate value combination that includes a plurality of intermediate values for a plurality of intermediate components;

setting an output value for black based on the intermediate value combination; and setting output values for the other printing-components based on the output value for black; and printing several second sample images based on several second output value combinations, each second output value combination including a plurality of output values for the plurality of printing-components including black, the several second output value combinations being determined by converting the several different primary-color-value combinations at the several grid points by using a second conversion table, the second conversion table listing up a plurality of printing-component-value combinations in one-to-one correspondence with at least the plurality of grid points, each printing-component-value combination including a plurality of values for a plurality of printing-components including black;

measuring colorimetric values of the several first sample images and the several second sample images;

judging whether or not a color difference between calorimetric values of one first sample image and one second sample image that are printed based on each grid point is greater than a predetermined threshold value;

determining, as an unsuitable grid point, a grid point that occurs a color difference greater than the predetermined threshold value;

determining, as a suitable grid point, a grid point that occurs a color difference smaller than or equal to the predetermined threshold value; and correcting the intermediate-component-value combination at the unsuitable grid point through interpolation based on the intermediate-component-value combination at the suitable grid point.

11. The image processing method as claimed in claim 10, wherein the intermediate-component-value combination at the unsuitable grid point is corrected through interpolation based on the intermediate-component-value combination at a suitable grid point that is located adjacent to the subject unsuitable grid point.

12. The image processing method as claimed in claim 10, wherein the plurality of intermediate components are the same as the plurality of primary colors.

13. The image processing method as claimed in claim 10, wherein the plurality of intermediate components are the same as the plurality of printing-components other than black.

14. The image processing method as claimed in claim 10, further comprising:

selecting, among the determined unsuitable grid point, one unsuitable grid point that is located farthest from the darkest grid point in the predetermined direction, and setting the selected unsuitable grid point as a N-th unsuitable grid point that is located N-th from the darkest grid point in the predetermined direction, N being an integer greater than or equal to one (1); and selecting one suitable grid point that is located next to the farthest unsuitable grid point in the predetermined direction and setting the selected suitable grid point as a (N+1)-th grid;

wherein the correcting includes correcting the intermediate-component-value combination at at least one grid point that is located between the darkest grid point and the (N+1)-th grid point through interpolation based on the intermediate-component-value combination at the darkest grid point and based on the intermediate-component-value combination at the (N+1)-th grid point.

15. The image processing method as claimed in claim 14, wherein the intermediate-component-value combination at the at least one grid point between the darkest grid point and the (N+1)-th grid point is corrected through linear interpolation based on the intermediate-component-value combinations at the darkest grid point and at the (N+1)-th grid point.

16. The image processing method as claimed in claim 14, further comprising setting a weighting coefficient,
wherein the intermediate-component-value combination at the at least one grid point between the darkest grid point and the (N+1)-th grid point is corrected through weighted interpolation based on the intermediate-component-value combinations at the darkest grid point and at the (N+1)-th grid point and based on the set weighting coefficient.

17. The image processing method as claimed in claim 10, further comprising:
receiving an input value combination that includes a plurality of input values for a plurality of primary colors and that is indicative of image information; and
converting the input value combination into a first output value combination,
the converting the input value combination into the first output value combination including:
converting, by using the corrected first conversion table, the received input value combination into an intermediate value combination that includes a plurality of intermediate values for a plurality of intermediate components,
setting the output value for black based on the intermediate value combination; and
setting output values for the other printing-components based on the output value for black; and
printing the first output value combination.

18. The image processing method as claimed in claim 17, further comprising receiving a second output value combination, the second output value combination including a plurality of output values for the plurality of printing-components including black, the second output value combination being determined by converting the input value combination by using the second conversion table,
wherein either one of the first output value combination and the second output value combination is printed.

19. An image processing apparatus, comprising:
a receiving unit that receives an input value combination that includes a plurality of input values for a plurality of primary colors and that is indicative of image information;
a storage unit that stores therein a first conversion table, the first conversion table defining a plurality of grid points that are arranged in a predetermined color space, in which the input value combination is located, the plurality of grid points being in one-to-one correspondence with a plurality of different primary-color-value combinations for the plurality of primary colors, the grid points including a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that, are located N-th and (N+1)-th among the at least (N+1) number of grid points, respectively, the first conversion table listing up an intermediate-component-value combination at each grid point, the intermediate-component-value combination, at at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point;
a first converting unit that converts the input value combination into a first output value combination, the first output value combination including a plurality of output values for a plurality of printing-components including black,
the first converting unit including:
an input-to-intermediate converting unit that converts, by using the first conversion table, the received input value combination into an intermediate value combination that includes a plurality of intermediate values for a plurality of intermediate components;
a black setting unit that sets the output value for black based on the intermediate value combination; and
an other-than-black setting unit that sets the output values for the other printing-components based on the output value for black; and
a printing unit that prints out the first output value combination.

20. The image processing apparatus as claimed in claim 19, wherein the plurality of intermediate components are the same as the plurality of primary colors.

21. The image processing apparatus as claimed in claim 19, wherein the plurality of intermediate components are the same as the plurality of printing-components other than black.

22. The image processing apparatus as claimed in claim 19, further comprising:
another receiving unit that receives a second output value combination, the second output value combination including a plurality of output values for the plurality of printing-components including black, the second output value combination being determined by converting the input value combination by using a second conversion table, the second conversion table listing up a plurality of printing-component-value combinations in one-to-one correspondence with a plurality of primary-color-value combinations,
wherein the printing unit prints out either one of the first output value combination and the second output value combination.

23. The image processing apparatus as claimed in claim 19, wherein the value N is one (1).

24. The image processing apparatus as claimed in claim 19, wherein the intermediate-component-value combination at the at least one grid point between the darkest grid point and the (N+1)-th grid point is determined through linear interpolation based on the intermediate-component-value combinations at the darkest grid point and at the (N+1)-th grid point.

25. The image processing apparatus as claimed in claim 19, wherein the intermediate-component-value combination at the at least one grid point between the darkest grid point and the (N+1)-th grid point is determined through weighted interpolation based on the intermediate-component-value combinations at the darkest grid point and at the (N+1)-th grid point and based on a weighting coefficient.

26. The image processing apparatus as claimed in claim 19, wherein the plurality of primary colors are made up from first through third different primary colors, the plurality of grid points being arranged in the predetermined color space, in which first through third axes of the first through third different primary colors extend in three different directions from the darkest grid point, wherein the grid points include a plurality of grid points that are successively arranged on the first axis from the darkest grid point, the grid points on the first axis including an N1-th grid point and an (N1+1)-th grid point that are located N1-th and (N1+1)-th among the plurality of grid points on the first axis, the intermediate-component-value combination, at at least one grid point that is located between the darkest grid point and the (N1+1)-th grid point along the first axis, being determined through interpolation based on the intermediate-component-value combinations at the darkest grid point and at the (N1+1)-th grid point on the first axis, wherein the grid points include a plurality of grid points that are successively arranged on the second axis from the darkest grid point, the grid points on the second axis including an N2-th grid point and an (N2+1)-th grid point that are located N2-th and (N2+1)-th among the plurality of grid points on the second axis, the intermediate-component-value combination, at at least one grid point that is located between the darkest grid point and the (N2+1)-th grid point along the second axis, being determined through interpolation based on the intermediate-component-value combinations at the darkest grid point and at the (N2+1)-th grid point on the second axis, and wherein the grid points include a plurality of grid points that are successively arranged on the third axis from the darkest grid point, the grid points on the third axis including an N3-th grid point and an (N3+1)-th grid point that are located N3-th and (N3+1)-th among the plurality of grid points on the third axis, the intermediate-component-value combination, at at least one grid point that is located between the darkest grid point and the (N3+1)-th grid point along the third axis, being determined through interpolation based on the intermediate-component-value combinations at the darkest grid point and at the (N3+1)-th grid point on the third axis.

27. The image processing apparatus as claimed in claim 19, wherein the value N is determined dependently on a plurality of color differences between a plurality of first sample images and a plurality of second sample images, the plurality of first sample images being printed based on a plurality of sets of first output combination, which are determined based on a plurality of input value combinations at a plurality of grid points, the plurality of grid points being successively arranged in the predetermined direction, the plurality of second sample images being printed based on a plurality of sets of second output combination that are determined based on the plurality of input value combinations.

28. An image processing apparatus, comprising:

a first storage unit that stores a first conversion table, the first conversion table defining a plurality of grid points that are arranged in a predetermined color space, the plurality of grid points being in one-to-one correspondence with a plurality of different primary-color-value combinations, each primary-color-value combination including a plurality of values for the plurality of primary colors, the grid points including a darkest grid point that is indicative of a darkest point among all the grid points, the grid points further including several grid points that are successively arranged in a predetermined direction from the darkest grid point, the first conversion table listing up an intermediate-component-value combination at each grid point, the intermediate-component-value combination including a plurality of intermediate values for a plurality of intermediate components;

a first sample printing unit that prints several first sample images, by converting several primary-color-value combinations, which correspond to the several grid points, into several first output value combinations, each first output value combination including a plurality of output values for the plurality of printing-components including black, the first sample printing unit including:

a first sample converting unit that converts, by using the first conversion table, the corresponding primary-color-value combination into an intermediate value combination that includes a plurality of intermediate values for a plurality of intermediate components;

a black setting unit that sets an output value for black based on the intermediate value combination; and an other-than-black setting unit that sets output values for the other printing-components based on the output value for black; and a second sample printing unit that prints several second sample images based on several second output value combinations, each second output value combination including a plurality of output values for the plurality of printing-components including black, the several second output value combinations being determined by converting the several different primary-color-value combinations at the several grid points by using a second conversion table, the second conversion table listing up a plurality of printing-component-value combinations in one-to-one correspondence with at least the plurality of grid points, each printing-component-value combination including a plurality of values for a plurality of printing-components including black;

a receiving unit that receives measured calorimetric values of the several first sample images and the several second sample images;

a judging unit that judges whether or not a color difference between calorimetric values of one first sample image and one second sample image that are printed based on each grid point is greater than a predetermined threshold value;

an unsuitable-grid determining unit that determines, as an unsuitable grid point, a grid point that occurs a color difference greater than the predetermined threshold value;

a suitable-grid determining unit that determines, as a suitable grid point, a grid point that occurs a color difference smaller than or equal to the predetermined threshold value; and a correcting unit that corrects the intermediate-component-value combination at the unsuitable grid point through interpolation based on the intermediate-component-value combination at the suitable grid point.

29. The image processing apparatus as claimed in claim 28, wherein the plurality of intermediate components are the same as the plurality of primary colors.

30. The image processing apparatus as claimed in claim 28, further comprising a coefficient-setting unit that sets a weighting coefficient,
wherein the correcting unit corrects the intermediate-component-value combination at the unsuitable grid point through weighted interpolation based on the intermediate-component-value combination at the suitable grid point and based on the set weighting coefficient.

31. The image processing apparatus as claimed in claim 28, further comprising:
a first input unit that receives an input value combination that includes a plurality of input values for a plurality of primary colors and that is indicative of image information; and
an input-to-output converting unit that converts the input value combination into a first output value combination, the input-to-output converting unit including:
an input-to-intermediate converting unit that converts, by using the corrected first conversion table, the received input value combination into an intermediate value combination,
a black setting unit that sets the output value for black based on the intermediate value combination; and
an other-than-black setting unit that sets output values for the other printing-components based on the output value for black; and
a printing unit that prints the first output value combination.

32. The image processing apparatus as claimed in claim 31, further comprising a second input unit that inputs a second output value combination that is obtained by converting the input value combination by using the second conversion table,
wherein the printing unit prints either one of the first output value combination and the second output value combination.

33. A data storage medium storing an image processing program readable by a computer, the image processing program comprising:
a program for receiving an input value combination that includes a plurality of input values for a plurality of primary colors and that is indicative of image information;

a program for converting the input value combination into a first output value combination, the first output value combination including a plurality of output values for a plurality of printing-components including black,
the program for converting the input value combination into the first output value combination including:
a program for converting, by using a first conversion table, the received input value combination into an intermediate value combination that includes a plurality of intermediate values for a plurality of intermediate components,
the first conversion table defining a plurality of grid points that are arranged in a predetermined color space, in which the input value combination is located, the plurality of grid points being in one-to-one correspondence with a plurality of different primary-color-value combinations for the plurality of primary colors,
the grid points including a darkest grid point that is indicative of a darkest point among all the grid points, the grid points further including at least (N+1) number of grid points that are successively arranged in a predetermined direction from the darkest grid point, N being an integer greater than or equal to one (1), the grid points including an N-th grid point and an (N+1)-th grid point that are located N-th and (N+1)-th among the at least (N+1) number of grid points, respectively,
the first conversion table listing up an intermediate-component-value combination at each grid point, the intermediate-component-value combination, at at least one grid point that is located between the darkest grid point and the (N+1)-th grid point in the predetermined direction and that includes the N-th grid point, being determined through interpolation based on the intermediate-component-value combination at the darkest grid point and on the intermediate-component-value combination at the (N+1)-th grid point;
a program for setting the output value for black based on the intermediate value combination; and
a program for setting the output values for the other printing-components based on the output value for black; and
a program for printing the first output value combination.

* * * * *